United States Patent
Nakano et al.

(10) Patent No.: US 8,021,073 B2
(45) Date of Patent: Sep. 20, 2011

(54) SHAFT MEMBER COUPLING STRUCTURE

(75) Inventors: Kenichi Nakano, Saitama (JP);
Yoshihiro Yoshida, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 488 days.

(21) Appl. No.: 12/057,224

(22) Filed: Mar. 27, 2008

(65) Prior Publication Data
US 2008/0242431 A1 Oct. 2, 2008

(30) Foreign Application Priority Data
Mar. 30, 2007 (JP) ................................. 2007-095035

(51) Int. Cl.
*F16B 7/10* (2006.01)

(52) U.S. Cl. ...................................... 403/379.5; 464/11

(58) Field of Classification Search ................... 464/11, 464/112, 120; 137/625.34, 625.35; 403/305, 403/306, 379.3, 379.5; 60/489
See application file for complete search history.

(56) References Cited

U.S. PATENT DOCUMENTS

| | | | |
|---|---|---|---|
| 2,654,234 A * | 10/1953 | Christensen | ............. 403/292 X |
| 3,490,799 A * | 1/1970 | Shreeve | |
| 5,117,869 A | 6/1992 | Kolchinsky | |
| 5,122,007 A * | 6/1992 | Smith | .................... 403/379.5 X |
| 7,766,041 B2 * | 8/2010 | Tackes et al. | ......... 137/625.35 X |
| 2004/0152523 A1 * | 8/2004 | Lai | ............................... 464/112 |
| 2004/0237730 A1 | 12/2004 | Hirakata | |
| 2005/0198953 A1 | 9/2005 | Yoshida et al. | |
| 2005/0199384 A1 * | 9/2005 | Mack et al. | ............... 403/305 X |

FOREIGN PATENT DOCUMENTS

| | | |
|---|---|---|
| JP | 6-42446 A | 2/1994 |
| JP | 9-100909 A | 4/1997 |
| JP | 2920772 B2 | 4/1999 |
| JP | 2005-256979 A | 9/2005 |

* cited by examiner

*Primary Examiner* — Greg Binda
(74) *Attorney, Agent, or Firm* — Birch, Stewart, Kolasch & Birch, LLP

(57) ABSTRACT

A shaft member coupling structure includes first and second spool members lockably coupled in a condition wherein the spool members coaxially extend with a coupling part in the center, a fitting concave portion axially extends and is formed at the end of the first spool member and a fitting convex portion axially extends and can be fitted into the fitting concave portion and is formed at the end of the second spool member. A coupling pin is inserted into first and second coupling holes. Further, an annular holding groove concave in a circumferential direction is formed in a part in which the coupling hole is formed on the periphery of the first spool member, both ends of the coupling pin inserted into the coupling holes are covered with a ring fitted into the holding groove. Thus, the coupling pin is prevented from falling away.

16 Claims, 18 Drawing Sheets

SHAFT MEMBER COUPLING STRUCTURE

CROSS-REFERENCE TO RELATED APPLICATIONS

The present application claims priority under 35 USC 119 to Japanese Patent Application No. 2007-095035 filed on Mar. 30, 2007 the entire contents of which are hereby incorporated by reference.

BACKGROUND OF THE INVENTION

1. Field of the Invention

The present invention relates to shaft member coupling structure for lockably coupling two shaft members in a condition in which they coaxially extend with a coupling part in the center. More specifically, the invention relates to shaft member coupling structure which can be applied to a spool valve forming a clutch valve of a hydrostatic continuously variable transmission.

2. Description of Background Art

Various configurations of a hydrostatic continuously variable transmission are known. For example, hydrostatic continuously variable transmissions have been proposed and disclosed in JP-A No. H6-42446; JP Patent No. 2920772; JP-A No. H9-100909 and JP-A No. 2005-256979 by the applicants. These hydrostatic continuously variable transmissions disclosed in these patents and applications are each provided with a swash plate type plunger pump, a swash plate type plunger motor and a hydraulic closed circuit that connects a discharge port and a suction port of the swash plate type plunger pump to a suction port and a discharge port of the swash plate type plunger motor. The hydrostatic continuously variable transmission is configured so that a pump swash plate is driven by an engine, a pump cylinder and a motor cylinder are connected and are arranged on an output shaft, the rotation of a motor swash plate is regulated, and an angle of the motor swash plate can be variably adjusted.

A hydrostatic continuously variable transmission configured as described above is known wherein a clutch valve that connects and cuts off an oil passage on the high pressure side and an oil passage on the low pressure side respectively forming the hydraulic closed circuit is provided. A quantity in which the rotational driving force from the hydraulic pump is transmitted to the hydraulic motor is controlled and clutch control that cuts off this rotational transmission is executed. For example, in JP-A No. 2005-256979, an automatic clutch using such a clutch valve is disclosed. This clutch valve is provided with a valve spool movably arranged in a spool hole axially extending in the supporting shaft that rotatably supports the hydraulic pump and the hydraulic motor, and connects and cuts off the oil passage on the high pressure side and the oil passage on the low pressure side by axially moving the valve spool. The clutch valve is provided with a spring (energizing means) that energizes the valve spool in a direction of disengagement and a centrifugal governor that generates force corresponding to the input revolution speed, is opened and closed according to the balance among energizing force by the spring, governor force and a load depending upon internal pressure (high pressure), and executes control for connecting and cutting off the oil passage on the high pressure side and the oil passage on the low pressure side.

In the above-mentioned clutch valve, as the valve spool requires a part that receives the energizing force by the spring and governor force, a part that guides to enable axial smooth movement in the spool hole and a part that connects and cuts off the oil passage on the high pressure side and the oil passage on the low pressure side according to the axial movement, the valve spool is formed in an axially long shape. In this case, as high precision is required for the peripheral dimension of a guide part fitted into a guide hole formed in the supporting shaft and guided to be axially moved in the spool hole and the peripheral dimension of a valve part fitted to a part in which the oil passage on the high pressure side and the oil passage on the low pressure side are open in the spool hole for connecting and cutting off the oil passage on the high pressure side and the oil passage on the low pressure side according to the axial movement, the above-mentioned clutch valve has a problem that the manufacture of the valve spool is difficult and a great deal of manufacturing cost is required. In addition, when the precision is not met, the operational performance may be deteriorated.

The inventors proposed that the valve spool be formed by coupling a first spool member provided with a part for forming the guide part and a second spool member provided with a part for forming the valve part based upon the above-mentioned problems. Further, the inventors proposed a configuration wherein the first spool member and the second spool member coaxially extend and are mutually lockably coupled by a coupling pin extending in a direction perpendicular to the axis as shaft member coupling structure. However, in this configuration, the coupling pin is merely fitted into coupling holes extending in the direction perpendicular to the axis in the first and second spool members and a problem wherein the coupling pin falls away and may hinder rocking occurs. To prevent this problem, it is conceivable that the coupling pin is press-fitted into the coupling holes. However, a problem occurs wherein a press-fitted part may be broken during the press fitting and a problem occurs in that the man-hours needed for press fitting increases.

SUMMARY AND OBJECTS OF THE INVENTION

According to an embodiment of the present invention, a shaft member coupling structure is provided that is configured so that a coupling pin is fitted into coupling holes without press fitting and can be effectively and easily prevented from falling away.

Therefore, the shaft member coupling structure according to an embodiment of the present invention is based upon a shaft member coupling structure for lockably coupling two shaft members in a condition in which they coaxially extend with a coupling part in the center, and is configured so that a fitting concave portion axially extends and is formed at the end of one shaft member. A fitting convex portion axially extends and can be fitted into the fitting concave portion and is formed at the end of the other shaft member. A coupling pin is inserted into coupling holes that pierce the two shaft members in a direction perpendicular to the axis in the part in which the fitting concave portion and the fitting convex portion are fitted and the two shaft members are lockably coupled with the coupling pin in the center. In addition, an annular holding groove concave in a circumferential direction is formed in a part in which the coupling hole is formed on the periphery of the shaft member provided with the fitting concave portion and both ends of the coupling pin inserted into the coupling holes are covered with each ring fitted into each holding groove.

In the shaft member coupling structure, it is desirable that the ring is worked by bending wire in the shape of a ring and is formed in the shape of a circle by lapping and binding the ends of the wire.

In this case, it is desirable that the ring is formed in the shape of a coil by winding wire in the shape of a ring plural times.

In addition, it is desirable that the side of a part in which an end of the wire is lapped of the ring is worked and the ring is provided with a slightly narrower width than the width of the holding groove overall.

According to the shaft member coupling structure configured as described above, according to an embodiment of the present invention, as the ring is fitted into the annular holding groove concave in the circumferential direction formed in the part in which the coupling hole is formed on the periphery of the shaft member provided with the fitting concave portion and covers both ends of the coupling pin inserted into the coupling holes based upon the configuration that the coupling pin is inserted into the coupling holes that pierce the two shaft members in the direction perpendicular to the axis in the part in which the fitting concave portion and the fitting convex portion are fitted and the shaft members are lockably coupled with the coupling pin in the center, the coupling pin can be effectively prevented from falling away by the ring and the fitting of the ring can be also simplified.

When the ring is worked by bending the wire in the shape of a ring and is formed in the shape of a circle by lapping and binding the ends of the wire, the manufacture is easy and the ring can be easily fitted into the holding groove.

In this case, it is desirable that the ring is formed in the shape of a coil by winding the wire in the shape of a ring plural times and hereby, the ring can be effectively prevented from being detached from the holding groove.

When the side of the part in which the end of the wire is lapped is worked and the ring is provided with slightly narrower width than the width of the holding groove overall, the ring can be securely fitted into the holding groove without rattling.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2:
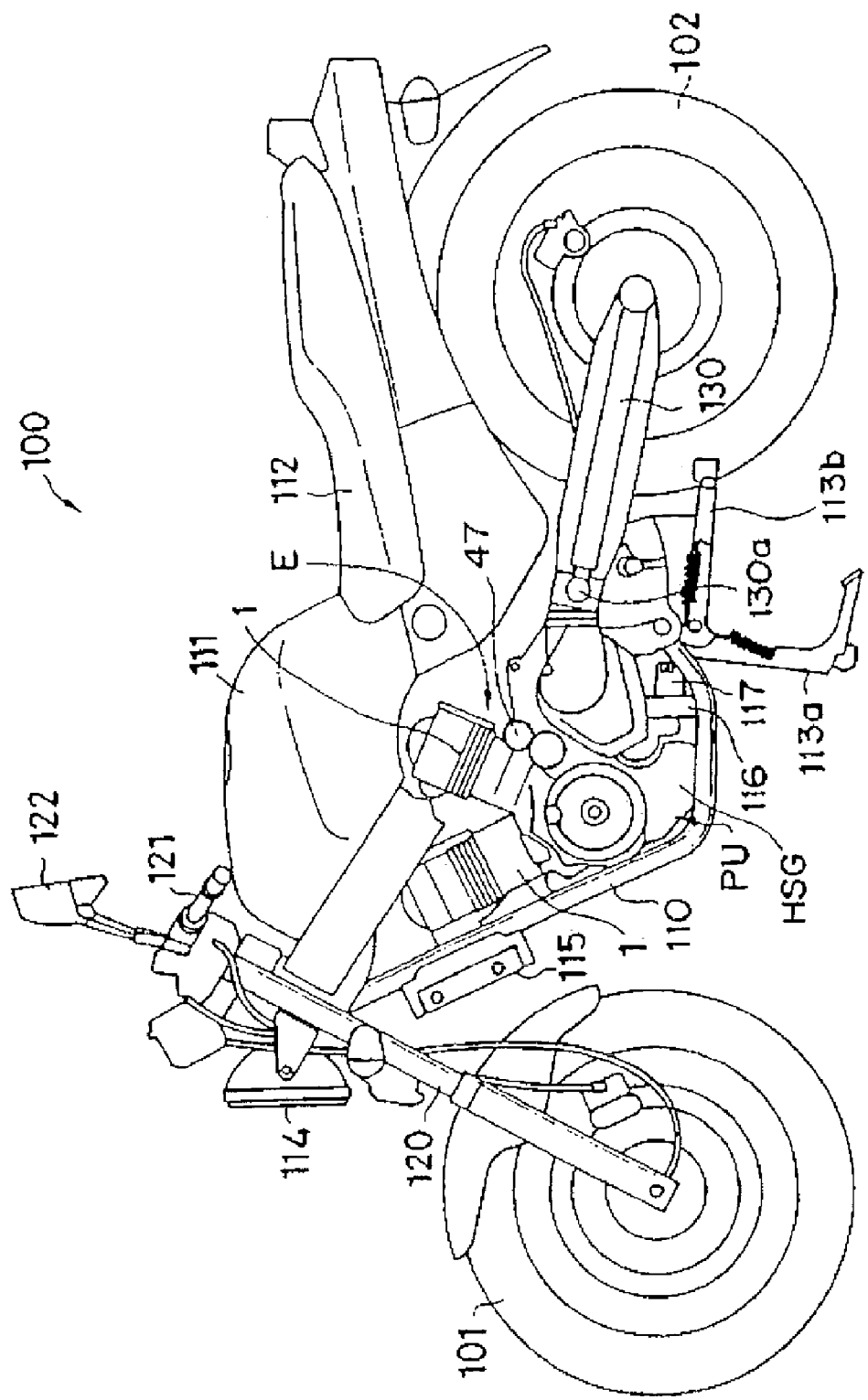
FIG. 2 is an outside drawing showing a motorcycle provided with the hydrostatic continuously variable transmission.

Referring to the drawings, a preferred embodiment of the invention will be described below. FIG. 2 illustrates the whole appearance of a motorcycle that is provided with a hydrostatic continuously variable transmission having a valve spool to which the invention is applied. The valve spool is used in a clutch of the hydrostatic continuously variable transmission. FIG. 2 shows a condition in which a side cover of the motorcycle is partially removed and its internal structure is exposed. This motorcycle 100 is provided with a main frame 110, a front fork 120 turnably attached to a front end of the main frame 110 with a diagonally vertically extended axis in the center, a front wheel 101 rotatably attached to a lower end of the front fork 120, a swing arm 130 vertically rockably fastened to the rear of the main frame 110 with a horizontally extended fastening shaft 130a in the center and a rear wheel 102 rotatably attached to a rear end of the swing arm 130.

A fuel tank 111 is provided together with a seat 112 for an occupant to sit, a main stand 113a and a substand 113b. A headlight 114 is provided that radiates light ahead during night driving. In addition, a radiator 115 is provided for cooling engine cooling water, a power unit PU is provided for generating rotational driving force for driving the rear wheel 102 and other parts are attached to the main frame 110. A handlebar (a steering handlebar) 121 is provided for the occupant to operate so as to steer the motorcycle, a rear view mirror 122 is provided for acquiring a back field of view and other parts are attached to the front fork 120. A drive shaft for transmitting the rotational driving force generated by the power unit PU to the rear wheel is provided in the swing arm 130 as described later.

Figure 3:
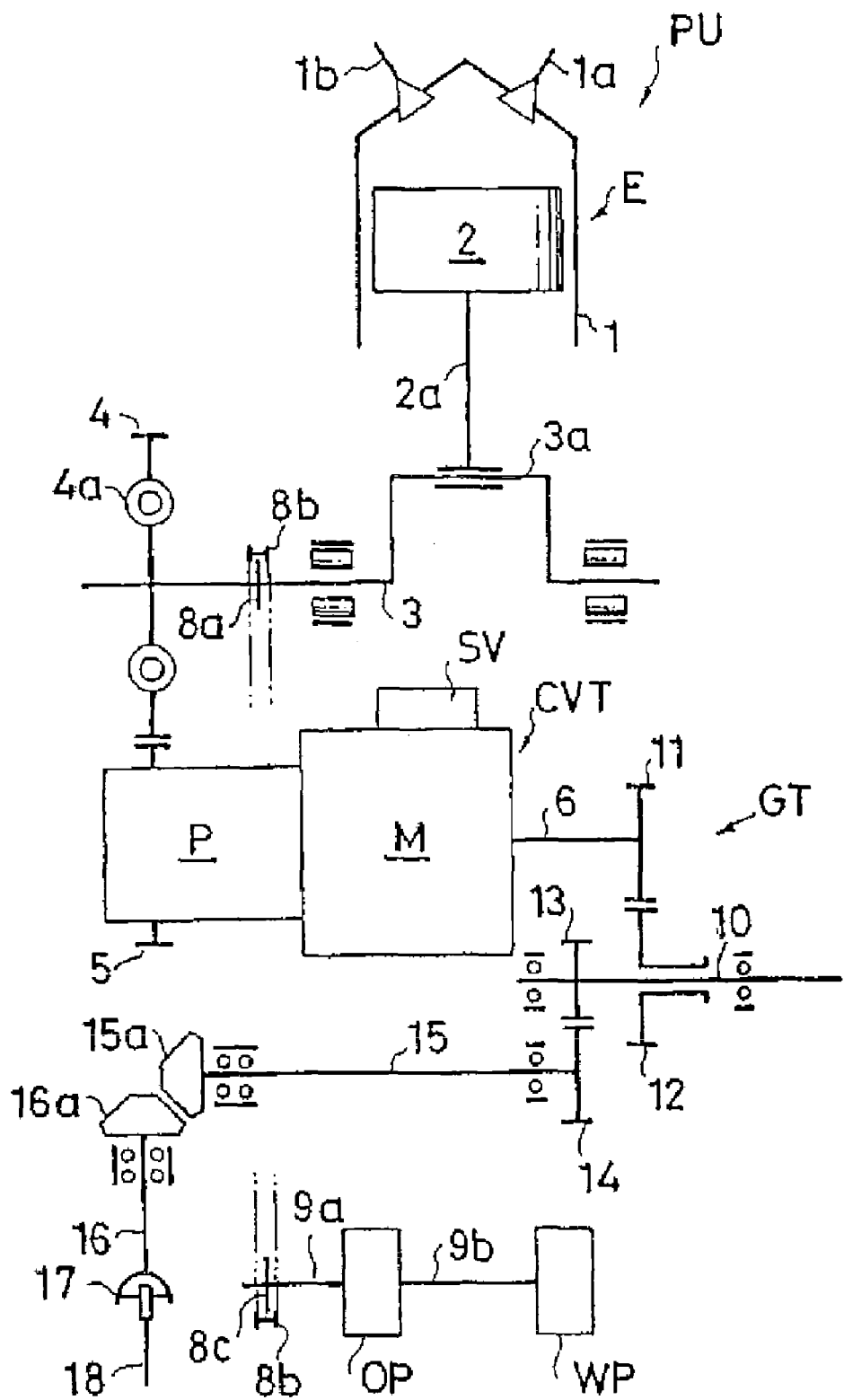
FIG. 3 is a schematic drawing showing the power transmission path configuration of a power unit provided with the hydrostatic continuously variable transmission.

In the motorcycle 100 configured as described above, the hydrostatic continuously variable transmission CVT is used for the power unit PU and the power unit PU will be described below. First, FIG. 3 shows the schematic configuration of the power unit PU and the power unit PU is provided with an engine E that generates rotational driving force, the hydrostatic continuously variable transmission CVT that continuously shifts output rotation and a transmission gear train GT that switches a rotational direction output from the hydrostatic continuously variable transmission CVT and transmits the output rotation.

As shown in FIG. 2, the engine E is a V-type engine provided with a V-type bank with cylinders 1 that extend diagonally upwardly in a longitudinal direction in a V type. The engine E is configured by arranging a piston 2 in each cylinder 1 provided with intake and exhaust valves 1a, 1b in each head. In the engine E, the intake valve la and the exhaust valve 1b are opened and closed at predetermined times, air-fuel mixture is combusted in the cylinder chamber for reciprocating the piston 2, the reciprocation of the piston 2 is transmitted to a crankcase 3a via a connecting rod 2a, and a crankshaft 3 is rotated. An input driving gear 4 provided with a damper 4a is attached to an end of the crankshaft 3 and the rotational driving force of the crankshaft 3 is transmitted to the input driving gear 4.

A driving sprocket 8a is attached to the crankshaft 3 and transmits the rotational driving force to a driven sprocket 8c attached to pump driving shafts 9a, 9b via a chain 8b. An oil pump OP and a water pump WP are arranged on the pump driving shafts 9a, 9b as shown in FIG. 3 and are driven by the engine E. Hydraulic fluid discharged from the oil pump OP is supplied as replenishment oil and lubricating oil of the hydrostatic continuously variable transmission CVT as described later. As shown in FIG. 2, the hydraulic fluid is cooled by an oil cooler 116 arranged in a rear lower part of the power unit PU, and is filtered by an oil filter 117. Cooling water discharged from the water pump WP is used for cooling the engine E, however, the cooling water the temperature of which rises because of the engine E is cooled by the radiator 115.

The hydrostatic continuously variable transmission CVT is also provided with a swash plate type plunger hydraulic pump P and a swash plate type plunger hydraulic motor M. An input driven gear 5 connected to a pump casing that forms the swash plate type plunger hydraulic pump P and is engaged with the input driving gear 4. The rotational driving force of the engine E is transmitted to the input driven gear 5, and the pump casing is rotated. The hydraulic pump P is a fixed capacity type with an angle of a swash plate of which that is fixed. The hydraulic motor M is a variable capacity type with an angle of a swash plate that is variable. The hydraulic motor is provided with a motor servomechanism SV for variably adjusting the angle of the swash plate. Though the details of the hydrostatic continuously variable transmission CVT are described later, the output rotation variably shifted by the hydrostatic continuously variable transmission CVT is output to a transmission output shaft 6.

The transmission gear train GT is connected to the transmission output shaft 6, and switching between a forward motion and neutral, deceleration and others are applied to the rotation of the transmission output shaft 6 by the transmission gear train GT. The transmission gear train CT is provided with a counter shaft 10 and a first output driving shaft 15 respectively extending in parallel with the transmission output shaft 6. The transmission gear train GT is also provided with a first gear 11 connected to the transmission output shaft 6, a second gear 12 arranged so that the second gear can be axially slid on the counter shaft 10 and is rotated integrally with the counter shaft 10, a third gear 13 connected to the counter shaft 10 and a fourth gear 14 ordinarily engaged with the third gear 13 and connected to the first output driving shaft 15. The second gear 12 is axially slid on the counter shaft 10 according to the operation for a change by the rider, is engaged with the first gear 11 to be a forward motion, and is also separated from the first gear 11 to be neutral.

An output driving bevel gear 15a is attached to an end of the first output driving shaft 15 and the rotational driving force is transmitted from an output driven bevel gear 16a engaged with the output driving bevel gear 15a to a second output driving shaft 16. The second output driving shaft 16 is connected to the drive shaft 18 via a universal joint 17. The drive shaft 18 is connected to the rear wheel 102 through the inside of the swing arm 130 as described above with the rotational driving force being transmitted to the rear wheel 102 for driving the rear wheel. The universal joint 18 is located coaxially with the fastening shaft 130a for fastening the swing arm 130 to the main frame 110.

Referring to FIGS. 1 and 4 to 6, the hydrostatic continuously variable transmission CVT will be described. The hydrostatic continuously variable transmission CVT is provided with the swash plate type plunger hydraulic pump P and the swash plate type plunger hydraulic motor M and the transmission output shaft 6 extends with the output shaft piercing its center. The transmission output shaft 6 is rotatably supported by a transmission housing HSG via ball bearings 7a, 7b, 7c.

The hydraulic pump P is configured by the pump casing 20 arranged on the transmission output shaft 6 coaxially and relatively rotatably with the transmission output shaft 6. A pump swash plate 21 is arranged inside the pump casing 20 with the pump swash plate tilted by a predetermined angle with a rotational central axis of the pump casing 20. A pump cylinder 22 is arranged opposite to the pump swash plate 21 with plural pump plungers 23 slidably arranged in each pump plunger hole 22a axially extending in an armular arrangement encircling a central axis of the pump cylinder in the pump cylinder 22. The pump casing 20 is rotatably supported by bearings 7b and 22c on the transmission output shaft 6 and on the pump cylinder 22 and is rotatably supported by the bearing 7a on the transmission housing HSG. The pump swash plate 21 is rotatably arranged with its axis tilted by bearings 21a, 21b by a predetermined angle with the pump casing 20 in the center. More specifically, the pump cylinder 22 is supported by the bearing 22c coaxially and relatively rotatably with the pump casing 20.

The input driven gear 5 is fastened to the periphery of the pump casing 20 by a bolt 5a. An outer end of the pump plunger 23 projects outwardly, is touched and fitted to a swash surface 21a of the pump swash plate 21, and its inner end located in the pump plunger hole 22a forms a pump oil chamber 23a in the pump plunger hole 22a opposite to a valve body 51 of a distributing valve 50 described later. A pump opening 22b that acts as a pump discharge port and a pump inlet is formed at the end of the pump plunger hole 22a. When the input driven gear 5 is driven as described above, the pump casing 20 is rotated, the pump swash plate 21 arranged inside the pump casing is rocked by the rotation of the pump casing 20, the pump plunger 23 is reciprocated in the pump plunger hole 22a according to the rocking of the swash plate surface 21a, and hydraulic fluid inside the pump oil chamber 23a is discharged and is sucked.

A pump eccentric member 20a is connected to a right end in the drawings of the pump casing 20 by a bolt 5b. An inside face 20b of the pump eccentric member 20a is formed in the shape of a cylinder eccentric with a rotational axis of the pump casing 20. The pump eccentric member 20a is provided with the inside face 20b eccentric as described above and is formed separately from the pump casing 20. Thus, the assembly is simple to manufacture.

The hydraulic motor M is configured by a motor casing 30 (formed by plural casings 30a, 30b) connected, fixed and held to/by the transmission housing HSG. A motor rocking member 35 is slidably supported by a supporting cylindrical surface 30c formed on an inside face of the motor casing 30 (the casing 30b) and is rockably supported with the center O of the rocking that extends in a direction (a direction perpendicular to a paper face) of a right angle with a central axis of the transmission output shaft 6 in the center. A motor swash plate 31 is rotatably supported by bearings 31a, 31b inside the motor rocking member 35 with a motor cylinder 32 being opposite to the motor swash plate 31. A plurality of motor plungers 33 are slidably arranged in each motor plunger hole 32a axially pierced in an annular arrangement encircling a central axis of the motor cylinder in the motor cylinder 32. The motor cylinder 32 is rotatably supported by the motor casing 30 via a bearing 32c on the periphery of the motor cylinder.

In the hydraulic motor M, a lock-up mechanism 90 (see FIGS. 15 to 17) is provided to a left end in the drawings of the motor casing 30 and a motor eccentric member 91 forming the lock-up mechanism 90 is slidably touched to an end of the motor casing 30. The lock-up mechanism 90 will be described later, however, it is rocked between a lock-up position in which a cylindrical inside face 91a formed on the motor eccentric member 91 is located coaxially with the motor cylinder 32 and a normal position in which the cylindrical inside face is located in an eccentric position with a rotational axis of the motor cylinder 32.

An outer end of the motor plunger 33 projects outwardly and is touched to a face 31a of the motor swash plate 31. An inner end located in the plunger hole 32a is opposite to the valve body 51, and forms a motor oil chamber 33a in the motor plunger hole 32a. A motor opening 32b, that acts as a motor discharge port and a motor inlet, is formed at the end of the motor plunger hole 32a. An arm part 35a formed by protruding an end of the motor rocking member 35 on the side of an outside diameter projects outwardly in a radial direction and is coupled to the motor servomechanism SV. Control for moving the arm part 35a laterally in FIG. 1 and others is executed by the motor servomechanism SV and control for rocking the motor rocking member 35 with the center O of rocking in the center is executed. When the motor rocking member 35 is rocked as described above, the motor swash plate 31 rotatably supported inside the motor rocking member is also rocked together, and an angle of the swash plate varies.

Figure 5:
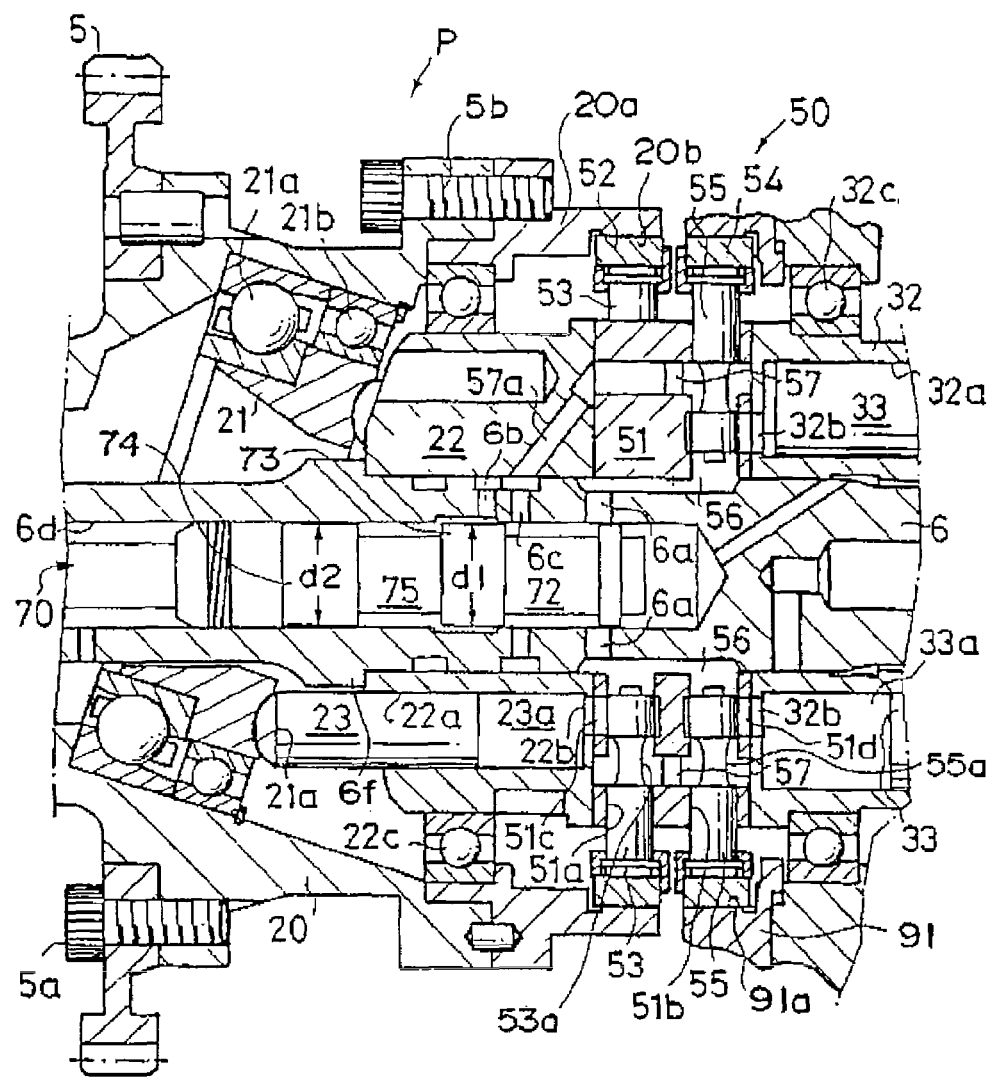
FIG. 5 is a sectional view enlarged to show the configuration of a part of the hydrostatic continuously variable transmission.
Figure 6:
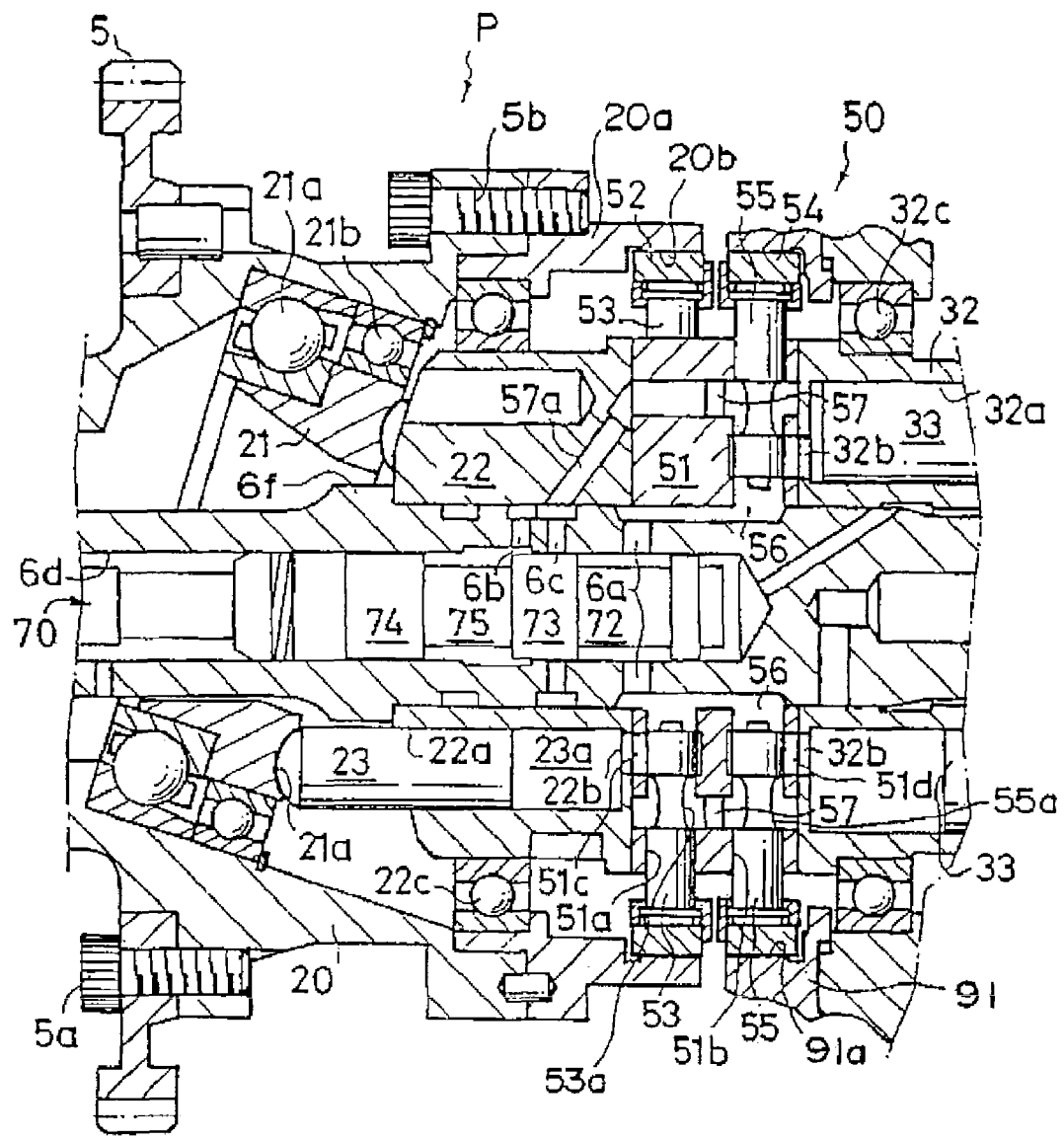
FIG. 6 is a sectional view enlarged to show the configuration of the part of the hydrostatic continuously variable transmission.

The distributing valve 50 is arranged between the pump cylinder 22 and the motor cylinder 32. FIGS. 5 and 6 show the part with the part enlarged, the valve body 51 of the distributing valve 50 is held between the pump cylinder 22 and the motor cylinder 32, is integrated with them by brazing, and the motor cylinder 32 is connected to the transmission output shaft 6 via a spline. Therefore, the pump cylinder 22, the distributing valve 50, the motor cylinder 32 and the transmission output shaft 6 are integrally rotated.

The pump cylinder 22, the distributing valve 50 (its valve body 51) and the motor cylinder 32 respectively integrated as described above are called an output rotor and are configuration for positioning and attaching the output rotor in an axial predetermined position on the transmission output shaft 6 will be described below. A regulating part 6f projecting in the shape of a flange on the peripheral side of the transmission output shaft 6 is formed for the positioning, a left end face of the pump cylinder 22 is touched to the regulating part 6f, and to the left positioning is performed. In the meantime, the to the right positioning of the output rotor is performed by a fitting member 80 attached to the transmission output shaft 6 opposite to a right end face of the motor cylinder 32.

Figure 7:
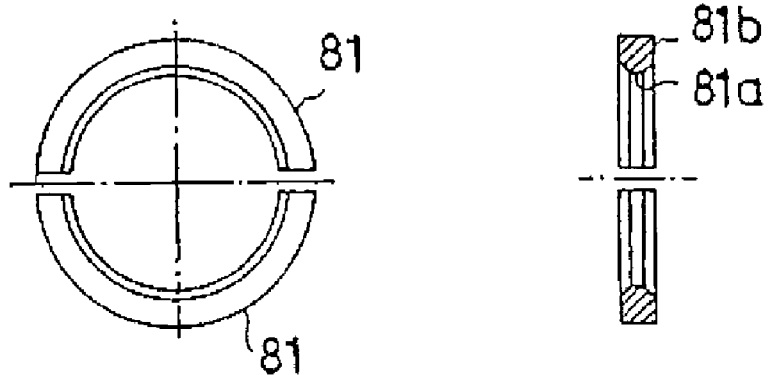
FIG. 7 is a front view and a sectional view showing a cotter used for positioning a rotor in the hydrostatic continuously variable transmission.
Figure 8:
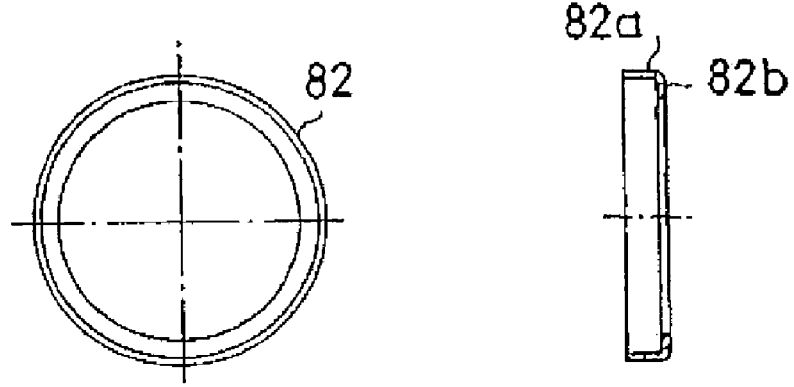
FIG. 8 is a front view and a sectional view showing a retainer ring used for positioning the rotor in the hydrostatic continuously variable transmission.
Figure 9:
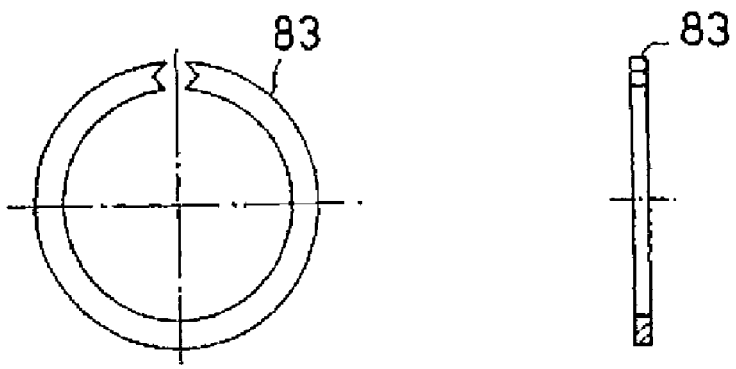
FIG. 9 is a front view and a sectional view showing a snap ring used for positioning the rotor in the hydrostatic continuously variable transmission.
Figure 12:
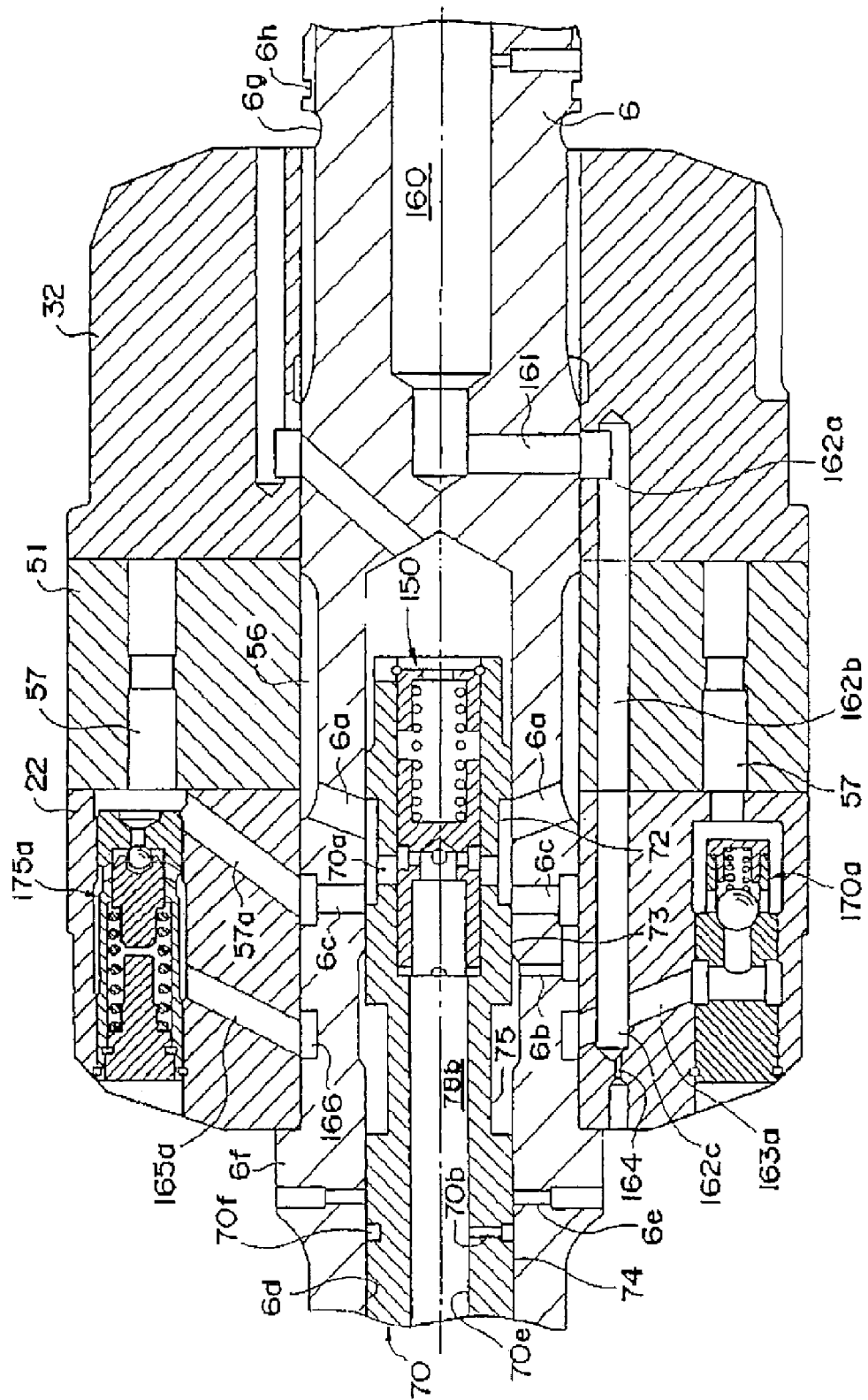
FIG. 12 is a sectional view showing the structure of a transmission output shaft and the output rotor in the hydrostatic continuously variable transmission.
Figure 13:
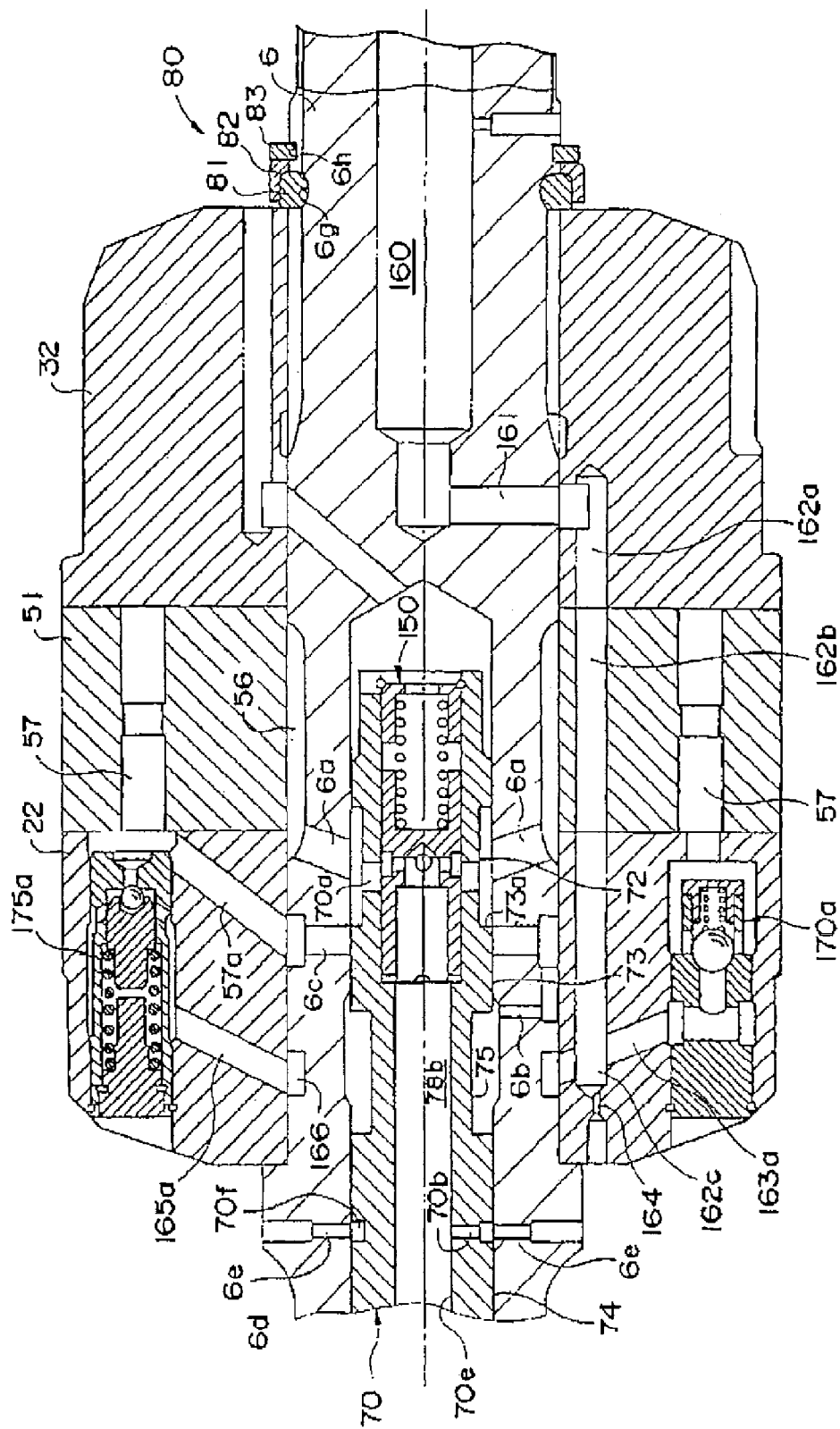
FIG. 13 is a sectional view showing the structure of the transmission output shaft and the output rotor in the hydrostatic continuously variable transmission.
Figure 14:
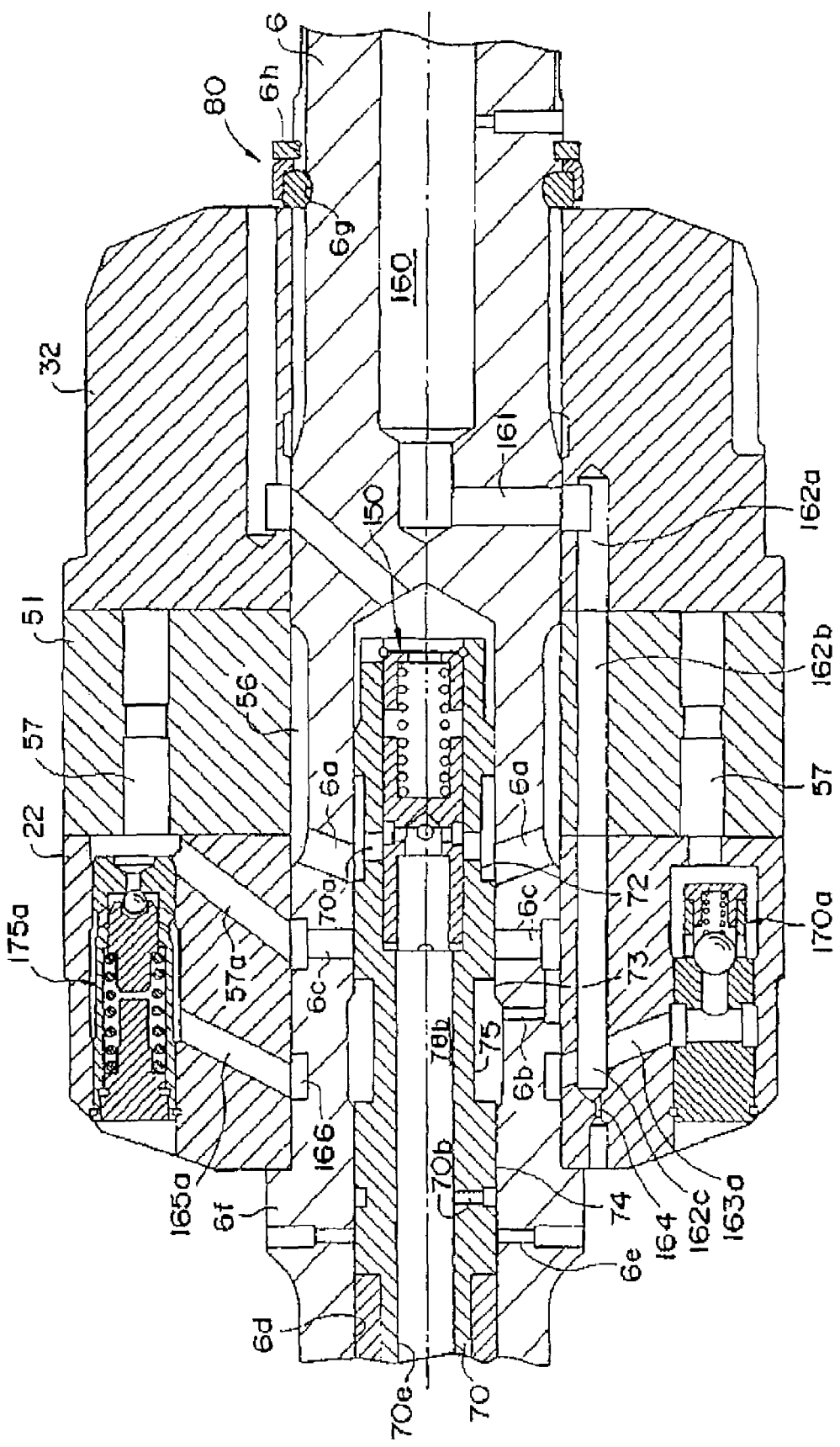
FIG. 14 is a sectional view showing the structure of the transmission output shaft and the output rotor in the hydrostatic continuously variable transmission.

As shown in FIGS. 12 to 14 in detail, a first fitting groove 6g and a second fitting groove 6h respectively annular are formed on the transmission output shaft 6 so as to attach the fitting member 80. Inside faces 81a of a pair of cotters 81 formed by dividing in a semicircle as shown in FIG. 7 are fitted into the first fitting groove 6g. A retainer ring 82 shown in FIG. 8 is attached on the cotters, a side plate 82b of the retainer ring 82 is touched to the sides of the cotters 81, a peripheral plate 82a covers outside faces 81b of the cotters 81, and the retainer ring holds the cotters 81 in this condition. Further, a snap ring 83 shown in FIG. 9 is fitted into the second fitting groove 6h and holds the retainer ring 82 in this condition. As a result, the right end face of the motor cylinder 32 is touched to the fitting member 80 and right positioning is performed. As known from the above-mentioned configuration, the output rotor is positioned on the transmission output shaft 6 between the regulating part 6f and the fitting member 80.

The distributing valve 50 will be described as illustrated in FIGS. 5 and 6. A plurality of pump-side spool holes 51a and a plurality of motor-side spool holes 51b respectively extend in a radial direction and are formed at an equal interval in a circumferential direction are formed in two rows in the valve body 51 forming the distributing valve 50. A pump-side spool 53 is slidably arranged in the pump-side spool hole 51a and a motor-side spool 55 is slidably arranged in the motor-side spool hole 51b.

The pump-side spool hole 51a is formed corresponding to the pump plunger hole 22a and the plurality of pump-side communicating passages 51c each of which connects the corresponding pump opening 22b (the corresponding pump oil chamber 23a) and the corresponding pump-side spool hole 51a are formed in the valve body 51. The motor-side spool hole 51b is formed corresponding to the motor plunger hole 32a and the plurality of motor-side communicating passages 51d each of which connects the corresponding motor opening 32b (the corresponding motor oil chamber 33a) and the corresponding motor-side spool hole 51b are formed in the valve body 51.

In the distributing valve 50, a pump-side cam ring 52 is further arranged in a position encircling a peripheral end of the pump-side spool 53 and a motor-side cam ring 54 is further arranged in a position encircling a peripheral end of the motor-side spool 55. The pump-side cam ring 52 is attached to the inside face 20b made eccentric from the rotational central axis of the pump casing 20 on the inner surface of the pump eccentric member 20a connected to an end of the pump casing 20 by the bolt 5b and is rotatably supported by the pump casing 20. The motor-side cam ring 54 is attached on an inside face 91a of a motor eccentric member 91 slidably located at the end of the motor casing 30. A peripheral end of the pump-side spool 53 is relatively rotatably fitted to an inside face of the pump-side cam ring 52 and a peripheral end of the motor-side spool 55 is relatively rotatably fitted to an inside face of the motor-side cam ring 54.

An inside passage 56 is formed between an inside face of the valve body 51 and the periphery of the transmission output shaft 6 and inside ends of the pump-side spool hole 51a and the motor-side spool hole 51b communicate with the inside passage 56. In addition, an outside passage 57 that connects the pump-side spool hole 51a and the motor-side spool hole 51b is formed in the valve body 51.

The action of the distributing valve 50 configured as described above will be described. When the driving force of the engine E is transmitted to the input driven gear 5 and the pump casing 20 is rotated, the pump swash plate 21 is rocked according to the rotation. Therefore, the pump plunger 23 touched and fitted to the swash surface 21a of the pump swash plate 21 is axially reciprocated in the pump plunger hole 22a by the rocking of the pump swash plate 21, hydraulic fluid is discharged from the pump oil chamber 23a via the pump opening 22b according to the inside movement of the pump plunger 23, and is sucked in the pump oil chamber 23a through the pump opening 22b according to the outside movement.

At this time, the pump-side cam ring 52 attached to the inside face 20b of the pump eccentric member 20a connected to the end of the pump casing 20 is rotated together with the pump casing 20. However, as the pump-side cam ring 52 is attached with the pump-side cam ring eccentric with the rotational center of the pump casing 20, the pump-side spool 53 is reciprocated in the radial direction in the pump-side spool hole 51a according to the rotation of the pump-side cam ring 52. When the pump-side spool 53 is reciprocated and is moved on the side of an inside diameter from a condition shown in FIGS. 5 and 6 as described above, the pump-side communicating passage 51c and the outside passage 57 communicate via a spool groove 53a. When the pump-side spool 53 is moved on the side of an outside diameter from the condition shown in FIGS. 5 and 6, the pump-side communicating passage 51c and the inside passage 56 communicate.

While the swash plate 21 is rocked according to the rotation of the pump casing 20 and the pump plunger 23 is reciprocated between a position (called a bottom dead center) in which the pump plunger is pushed on the outermost side and a position (called a top dead center) in which the pump plunger is pushed on the innermost side, the pump-side cam ring 52 reciprocates the pump-side spool 53 in the radial direction. As a result, when the pump plunger 23 is moved from the bottom dead center to the top dead center according to the rotation of the pump casing 20 and the hydraulic fluid in the pump oil chamber 23a is discharged via the pump opening 22b, the hydraulic fluid is delivered into the outside passage 57 through the pump-side communicating passage 51c. In the meantime, when the pump plunger 23 is moved from the top dead center to the bottom dead center according to the rotation of the pump casing 20, hydraulic fluid in the inside passage 56 is sucked in the pump oil chamber 23a through the pump-side communicating passage 51c and the pump opening 22b. As known from this, when the pump casing 20 is rotated, hydraulic fluid discharged from the hydraulic pump P is supplied to the outside passage 57 and the hydraulic fluid is sucked in the hydraulic pump P from the inside passage 56.

In the meantime, as the motor-side cam ring 54 attached on the inside face 91a of the motor eccentric member 91 slidably located at the end of the motor casing 30 is eccentric with the rotational center of the motor cylinder 32 (the output rotor and the transmission output shaft 6) when the motor eccentric member 91 is located in a normal position, the motor-side spool 55 is reciprocated in the radial direction in the motor-side spool hole 51b according to the rotation of the motor cylinder 32. When the motor-side spool 55 is reciprocated as described above and is moved on the side of the inside diameter from the condition shown in FIGS. 5 and 6, the motor-side communicating passage 51d and the outside passage 57 communicate via a spool groove 55a. When the motor-side spool 55 is moved on the side of the outside diameter from the condition shown in FIGS. 5 and 6, the motor-side communicating passage 51d and the inside passage 56 communicate. A situation wherein the motor eccentric member 91 is located in a lock-up position will be described later and the situation wherein the motor eccentric member is located in the normal position is described above.

As described above, hydraulic fluid discharged from the hydraulic pump P is delivered into the outside passage 57, is supplied to the motor oil chamber 33a from the motor-side communicating passage 51d via the motor opening 32b, and the motor plunger 33 is thrusted axially outward. As described above, the motor plunger is configured so that an outside end of the motor plunger 33 to which the axial outward pressure is applied is slid from the top dead center to the bottom dead center on the motor swash plate 31 in a condition shown in FIG. 1 in which the motor rocking member 35 is rocked, and the motor cylinder 32 is rotated so that the motor plunger 33 is moved from the top dead center to the bottom dead center along the motor swash plate 31 by the axial outward thrust.

To enable such rotation, while the motor plunger 33 is reciprocated between the position in which the motor plunger is pushed on the outermost side (the bottom dead center) and the position in which the motor plunger is pushed on the innermost side (the top dead center) according to the rotation of the motor cylinder 32, the motor-side cam ring 54 reciprocates the motor-side spool 55 in the radial direction. When the motor cylinder 32 is rotated as described above, the motor plunger 33 is pushed and moved from the bottom dead center to the top dead center, that is, inward along the motor swash plate 31 according to the rotation and hydraulic fluid in the motor oil chamber 33a is delivered into the inside passage 56 from the motor opening 32b via the motor-side communicating passage 51d. The hydraulic fluid delivered into the inside passage 56 as described above is sucked in the pump oil chamber 23a through the pump-side communicating passage 51c and the pump opening 22b as described above.

As set forth in the above-mentioned description, when the pump casing 20 is rotated by the rotational driving force of the engine E, hydraulic fluid is discharged into the outside passage 57 from the hydraulic pump P, is delivered into the hydraulic motor M, and rotates the motor cylinder 32. The hydraulic fluid that rotates the motor cylinder 32 is delivered into the inside passage 56 and is sucked in the hydraulic pump P from the inside passage 56. As described above, a hydraulic closed circuit connecting the hydraulic pump P and the hydraulic motor M is formed by the distributing valve 50, hydraulic fluid discharged from the hydraulic pump P according to the rotation of the hydraulic pump P is delivered into the hydraulic motor M via the hydraulic closed circuit, the hydraulic motor is rotated, and farther, the hydraulic fluid that drives the hydraulic motor M and is discharged is returned to the hydraulic pump P via the hydraulic closed circuit.

In this case, when the hydraulic pump P is driven by the engine E, the rotational driving force of the hydraulic motor M is transmitted to the wheels and the vehicle drives, the outside passage 57 is an oil passage on the high pressure side and the inside passage 56 is an oil passage on the low pressure side. In the meantime, when the driving force of the wheel is transmitted to the hydraulic motor M, the rotational driving force of the hydraulic pump P is transmitted to the engine E and engine brake action is produced as in driving on a descending slope, the inside passage 56 is turned an oil passage on the high pressure side and the outside passage 57 is tamed an oil passage on the low pressure side.

At this time, as the pump cylinder 22 and the motor cylinder 32 are connected to the transmission output shaft 6 and are integrally rotated, the pump cylinder 22 is also rotated together as described above when the motor cylinder 32 is rotated and relative revolution speed between the pump casing 20 and the pump cylinder 22 is reduced. Therefore, the relation between the revolution speed Ni of the pump casing 20 and the revolution speed No of the transmission output shaft 6 (that is, the revolution speed of the pump cylinder 22 and the motor cylinder 32) is as shown in the following expression (1) in relation to pump capacity Vp and motor capacity Vm.

(Mathematical Expression 1)

$$Vp \cdot (Ni - No) = Vm \cdot No \quad (1)$$

The motor capacity Vm can be continuously varied by control that the motor rocking member 35 is rocked according to the motor servomechanism SV. That is, when the revolution speed Ni of the pump swash plate 21 is fixed in the expression (1), the revolution speed of the transmission output shaft 6 continuously shifts in control that the motor capacity Vm is continuously varied and as known from this, shift control is executed by rocking the motor rocking member 35 and varying the motor capacity Vm by the motor servomechanism SV.

In a control wherein an oscillation angle of the motor rocking member 35 is reduced, the motor capacity Vm decreases. When the pump capacity Vp is fixed and the revolution speed Ni of the pump swash plate 21 is fixed in the relation shown in the expression (1), control that the revolution speed of the transmission output shaft 6 is increased so that the revolution speed approaches the revolution speed Ni of the pump swash plate 21, that is, continuous shift control to top speed is executed. When an angle of the motor swash plate is zero, that is, when the motor swash plate is upright, the transmission gear ratio is theoretically the top gear ratio (Ni=No) to be in a condition wherein the oil pressure is locked, the pump casing 20 is rotated integrally with the pump cylinder 22, the motor cylinder 32 and the transmission output shaft 6, and mechanical power transmission is performed.

As described above, the control wherein the motor capacity is continuously varied is executed by rocking the motor rocking member 35 and variably controlling the angle of the motor swash plate. Mainly referring to FIG. 10, the motor servomechanism SV for rocking the motor rocking member 35 as described above will be described below.

The motor servomechanism SV is provided with a ball screw shaft 41 located in the vicinity of the arm part 35*a* of the motor rocking member 35, extending in parallel with the transmission output shaft 6 and rotatably supported by the transmission housing HSG via bearings 40*a*, 40*b* and a ball nut 40 screwed on a male screw 41*a* formed on the periphery of the ball screw shaft 4*l*. A ball female screw is formed by multiple balls held in the shape of a screw according to a gauge on the inside face of the ball nut 40 and is screwed on the male screw 41*a*. The ball nut 40 is coupled to the arm part 35*a* of the motor rocking member 35, when the ball screw shaft 41 is rotated, the ball nut 40 is moved laterally on the ball screw shaft 41, and the motor rocking member 35 is rocked.

A swash plate control motor (an electric motor) 47 is attached on the outside face of the transmission housing HSG to rotate the ball screw shaft 41 as described above. An idle shaft 43 is provided in parallel with a driving shaft 46 of the swash plate control motor 47 and an idle gear member provided with gears 44 and 45 is rotatably attached on the idle shaft 43. A gear 46*a* is formed at the end of the driving shaft 46 of the swash plate control motor 47 and is engaged with the gear 45. In the meantime, a gear 42 is connected to a shaft part 41*b* formed by protruding a left part of the ball screw shaft 41 to the left and is engaged with the gear 44.

Therefore, when the driving shaft 46 is rotated with the rotation of the swash plate control motor 47 controlled, the rotation is transmitted to the gear 45, is transmitted from the gear 44 integrally rotated with the gear 45 to the gear 42, and the ball screw shaft 41 is rotated. The ball nut 40 is moved laterally on the shaft 41 according to the rotation of the ball screw shaft 41 and control for rocking the motor rocking member 35 is executed. As the rotation of the swash plate control motor 47 is transmitted to the ball screw shaft 41 via the gears 46*a*, 45, 44, 42 as described above, the transmission ratio can be freely varied by suitably setting the gear ratio of these gears.

Figure 10:
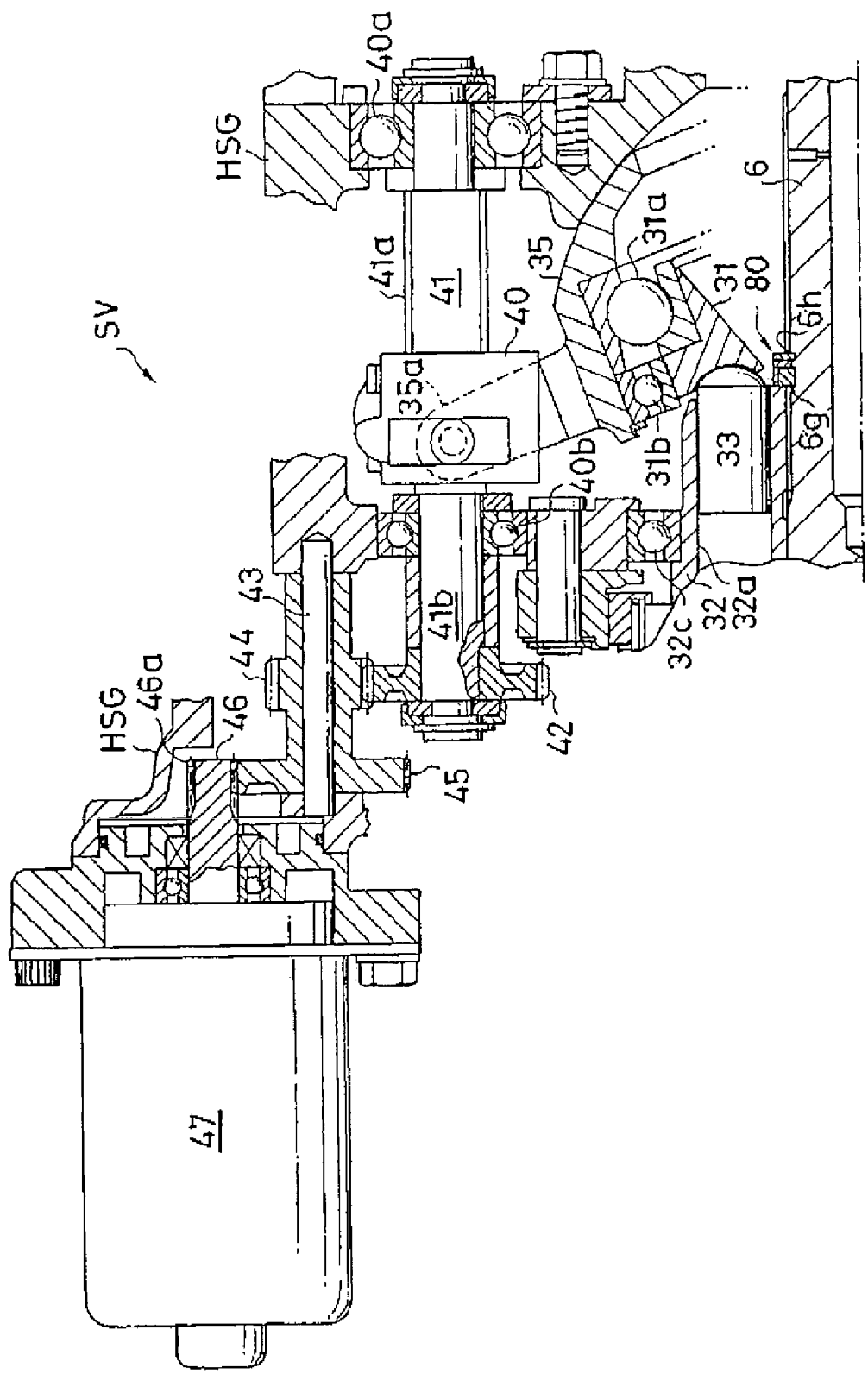
FIG. 10 is a sectional view showing a motor servo mechanism in the hydrostatic continuously variable transmission.

The swash plate control motor 47 is arranged with the swatch control motor 47 being exposed outside in the vicinity of the rear side of the base of the rear cylinder 1 in the V-type engine E as shown in FIG. 2. The cylinder 1 is integrated with the transmission housing HSG and the swash plate control motor 47 is arranged in a space between the rear cylinder 1 and the transmission housing HSG. As the space can be effectively utilized by arranging the swash plate control motor 47 in the space between the rear cylinder 1 and the transmission housing HSG as described above and the swash plate control motor is located apart from the fastening shaft 130*a* of the swing arm 130 shown in FIG. 2, no limitation for avoiding interference with the swing arm 130 is applied to the shape of the swing arm. In addition, the swash plate control motor 47 can be protected from a splash from the downside of the body during driving from rainwater in a front direction and from dust. Further, the swash plate control motor 47 is arranged with the swatch control motor 47 being biased on the left side from the center in a lateral direction of the body as shown in FIG. 10 and is effectively cooled by efficiently hitting an air flow from the front direction in driving on the swash plate control motor 47.

In the hydrostatic continuously variable transmission CVT configured as described above, when the inside passage 56 and the outside passage 57 communicate, no high pressure oil is generated and power transmission between the hydraulic pump P and the hydraulic motor M can be cut off. More specifically, clutch control is enabled by a communication angle control between the inside passage 56 and the outside passage 57. A clutch CL for the clutch control is provided to the hydrostatic continuously variable transmission CVT. As illustrated in FIGS. 11 to 14, the clutch CL will be described below.

The clutch CL is configured by a rotor 60 connected to the end of the pump casing 20 by a bolt 60*b*, weights 61 (balls or rollers) received in plural receiving grooves 60*a* diagonally extend in the radial direction on an inside face of the rotor 60, a disc like pressure receptor 62 is provided with an arm part 62*a* opposite to the receiving groove 60*a*. A spring 63 presses the pressure receptor 62 so that the arm part 62*a* presses the weight 61 in the receiving groove 60a and a valve spool 70 is fitted to a fitting part 62c on one end side of the pressure receptor 62.

Figure 1:
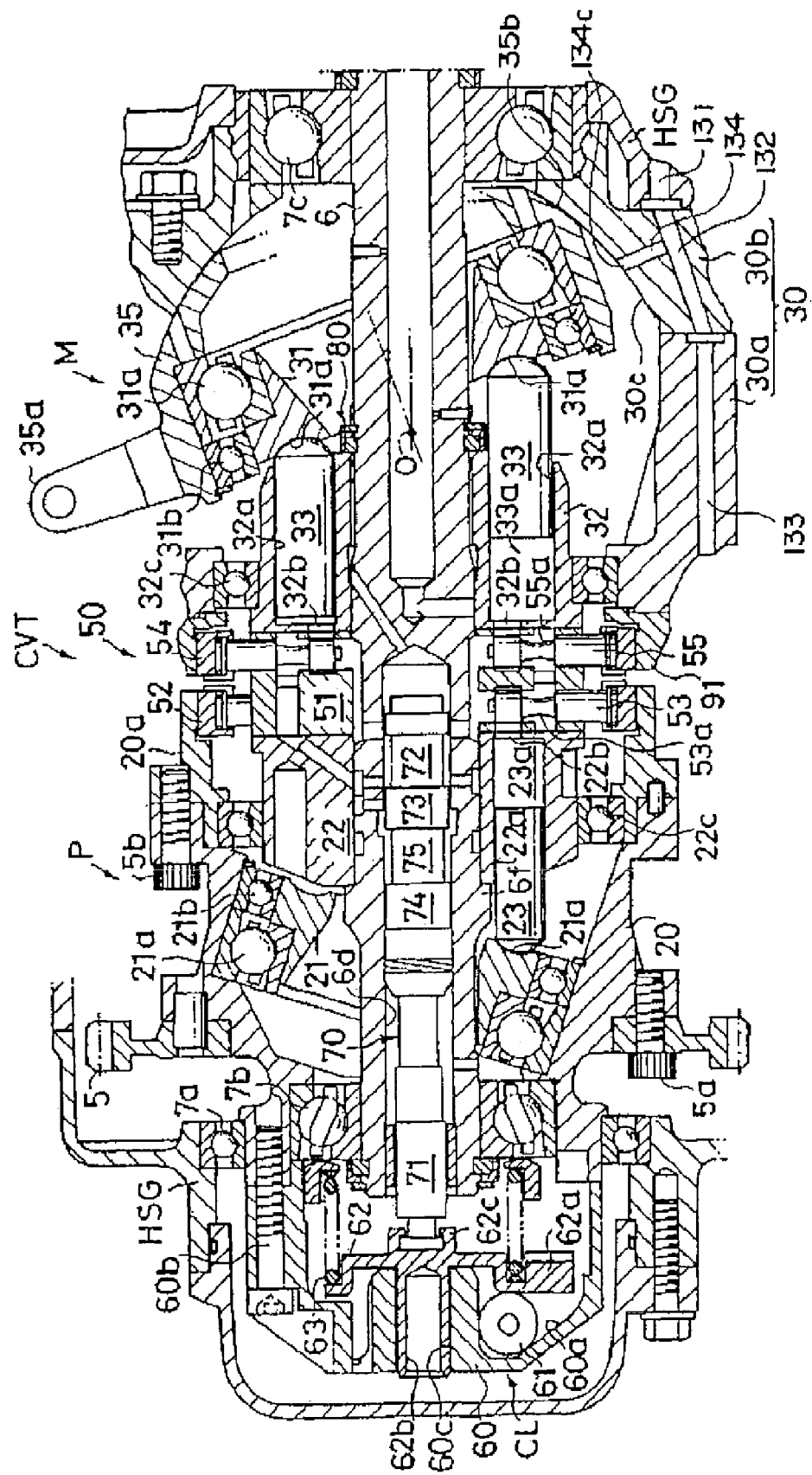
FIG. 1 is a sectional view showing the configuration of a hydrostatic continuously variable transmission provided with a clutch to which shaft member coupling structure according to the invention is applied.
Figure 11:
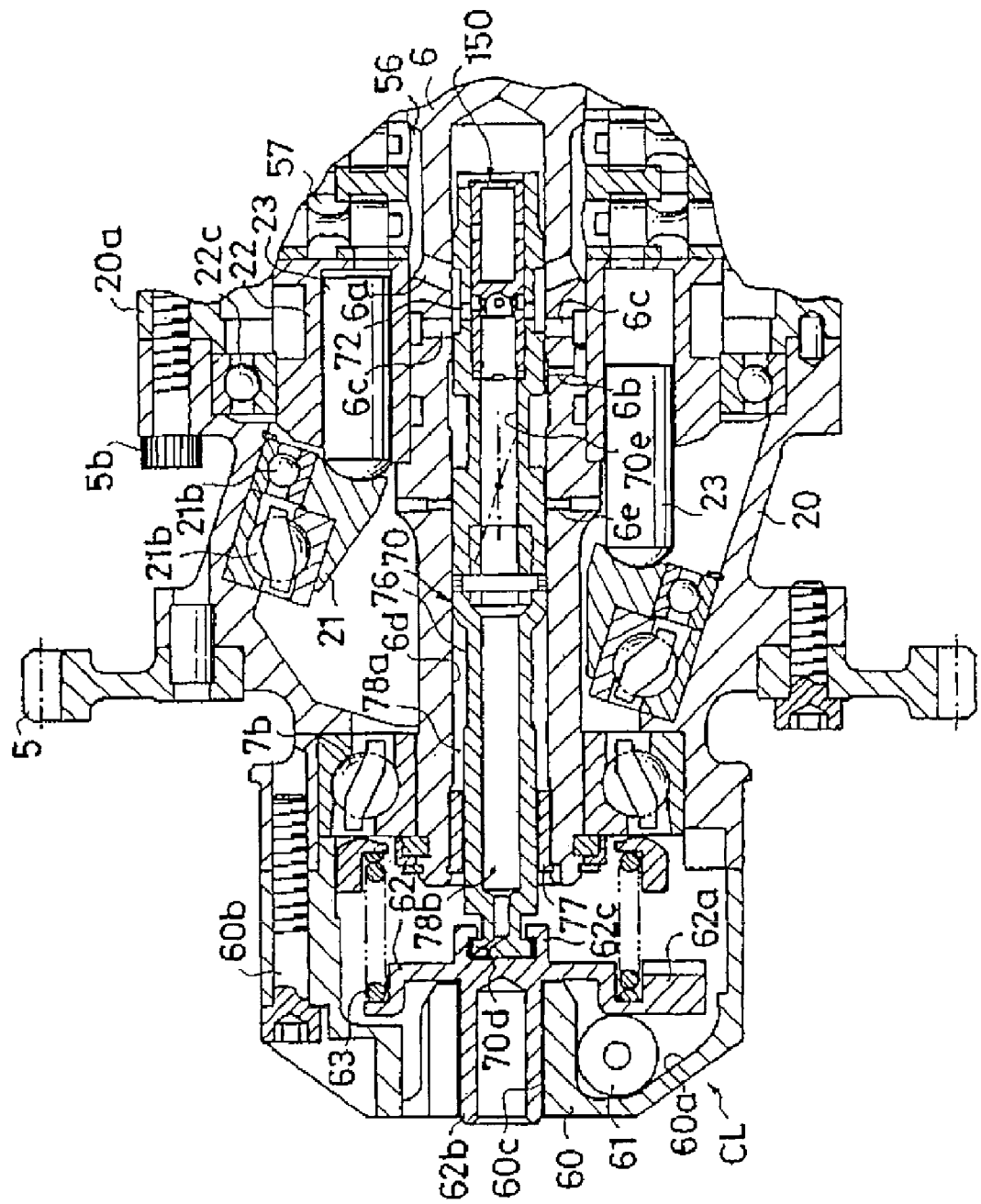
FIG. 11 is a sectional view showing the structure of a hydraulic pump and a clutch in the hydrostatic continuously variable transmission.

A through hole 60c having a rotational central axis in the center is formed in the rotor 60, a cylindrical part 62b of the pressure receptor 62 is movably inserted into the through hole 60c, and the pressure receptor 62 can be axially moved. Therefore, when the pump casing 20 is still and the rotor 60 is not rotated, the arm part 62a presses the weight 61 in the receiving groove 60a by energizing force applied to the pressure receptor 62 by the spring 63. At this time, as the receiving groove 60a diagonally extends as shown in FIG. 11, the weight 61 is pushed inward in the radial direction and the pressure receptor 62 is moved to the left as shown in FIGS. 1 and 11.

When the pump casing 20 is rotated and the rotor 60 is rotated from this condition, the weight 61 is pushed outward in the radial direction in the receiving groove 60a by centrifugal force. When the weight 61 is pushed out in a direction of an outside diameter by centrifugal force as described above, the weight 61 is moved diagonally to the right along the receiving groove 60a, pushes the arm part 62a to the right and the pressure receptor 62 is moved to the right against the pressure of the spring 63. The quantity in which the pressure receptor 62 is moved to the right varies according to centrifugal force that acts on the weight 61, that is, the revolution speed of the pump casing 20 and when the revolution speed is equal to or exceeds a predetermined revolution speed, the pressure receptor is moved to the right to a position shown in FIG. 4. The valve spool 70 fitted to the fitting part 62c of the pressure receptor 62 is moved axially laterally as described above and is fitted into a spool hole 6d open to an end of the transmission output shaft 6 and axially extends and is moved axially laterally together with the pressure receptor 62.

A governor mechanism that generates an axial governor force corresponding to the input revolution speed of the hydraulic pump P using a centrifugal force that acts on the weight 61 by the rotation of the pump casing 20 is configured by the rotor 60, the weight 61 and the pressure receptor 62.

An inside branched oil passage 6a branched from the inside passage 56 and connected to the spool hole 6d and outside branched oil passages 6b, 6c connected from a communicating passage 57a branched from the outside passage 57 to the spool hole 6d are formed in the transmission output shaft 6 in which the spool hole 6d is formed as shown in FIGS. 5, 6 and 11 to 14 in detail. FIGS. 5 and 12 correspond to FIG. 1 and show a condition wherein the pressure receptor 62 is moved to the left and the valve spool 70 is moved to the left, in this condition, the inside branched oil passage 6a and the outside branched oil passage 6c communicate via a right groove 72 of the valve spool 70, and the inside passage 56 and the outside passage 57 communicate. FIGS. 6 and 14 correspond to FIG. 4 and show a condition wherein the pressure receptor 62 is moved to the right and the valve spool 70 is moved to the right, in this condition, the inside branched oil passage 6a and the outside branched oil passage 6c are cut off by a central land 73 of the valve spool 70, and the inside passage 56 and the outside passage 57 are also cut off. FIG. 13 shows a condition in which the valve spool 70 is located in an intermediate position.

As described above, as the valve spool 70 is moved to the left when the pump casing 20 is still, the inside branched oil passage 6a and the outside branched oil passage 6c communicate at this time and power transmission between the hydraulic pump P and the hydraulic motor M is cut off to be in a condition wherein the clutch is disengaged. When the pump casing 20 is driven from this condition, the pressure receptor 62 is gradually moved to the right by centrifugal force that acts on the weight 61 according to the number of revolutions and speed of the pump casing and the valve spool 70 is also moved to the right together. As a result, the inside branched oil passage 6a and the outside branched oil passage 6c are gradually cut off by the central land 73 of the valve spool 70 and the clutch is gradually engaged.

In the hydrostatic continuously variable transmission CVT according to this embodiment, when the pump case 20 is rotated by the engine E, the valve spool 70 is moved to the left to be in the condition that the clutch is disengaged while engine speed is low (in idling) and as the engine speed rises, the clutch is gradually engaged.

An outside diameter d1 of the central land 73 in the valve spool 70 and an outside diameter d2 of a left land 74 are set so that d1<d2. Therefore, when the valve spool 70 is moved to the right to be in the condition that the clutch is engaged, oil pressure in the outside passage 57 that acts in a left groove 75 of the valve spool 70 acts in a direction in which the valve spool 70 is moved to the left. The to the left thrust corresponds to the magnitude of the oil pressure that acts in the left groove 75 and the difference in the pressure received area depends upon the difference between the outside diameters d1, d2. The difference in the pressure received area is fixed, however, the oil pressure that acts in the left groove 75 is oil pressure in the outside passage 57, varies according to the driving force, and the bigger the driving force is, the higher the oil pressure is. This configuration is equivalent to an oil pressure applying mechanism described in the scope of claims.

As known from this, clutch engagement control by the movement of the valve spool 70 is executed according to balance (Fgov=Fp+Fspg) among governor force (Fgov) generated by centrifugal force that acts on the weight 61 corresponding to the number of revolutions and speed of the pump casing 20, energizing force (Fspg) by the spring 63 and thrust (Fp) depending upon the oil pressure that acts in the left groove 75 of the valve spool 70. Control that the clutch is engaged as the rotation of the pump casing 20 increases is executed and control that force in a direction in which the clutch is disengaged is applied as the oil pressure of the outside passage 57 increases (as transmission driving force from the hydraulic pump P to the hydraulic motor M increases) is executed.

FIG. 13 shows a condition of an intermediate stage when clutch engagement control and clutch disengagement control are executed as described above, that is, a condition of a partial clutch engagement. In this condition, a right end 73a of the central land 73 of the valve spool 70 slightly communicates with the outside branched oil passage 6b to be in a condition wherein the inside passage 56 and the outside passage 57 partially communicate, that is, in the condition of partial clutch engagement. In the condition of partial clutch engagement, the inside passage 56 and the outside passage 57 communicate or are cut off by a slight axial movement of the valve spool 70. However, as the axial movement of the valve spool 70 is balanced among the governor force (Fgov), the energizing force and the thrust depends upon the oil pressure as described above, the valve spool 70 is operated on the side on which the clutch is disengaged. When the thrust depends upon the oil pressure rapidly increases by rapid throttle operation, the inside passage 56 and the outside passage 57 repeat communication and cut off, and it is difficult to stably transmit power.

Figure 4:
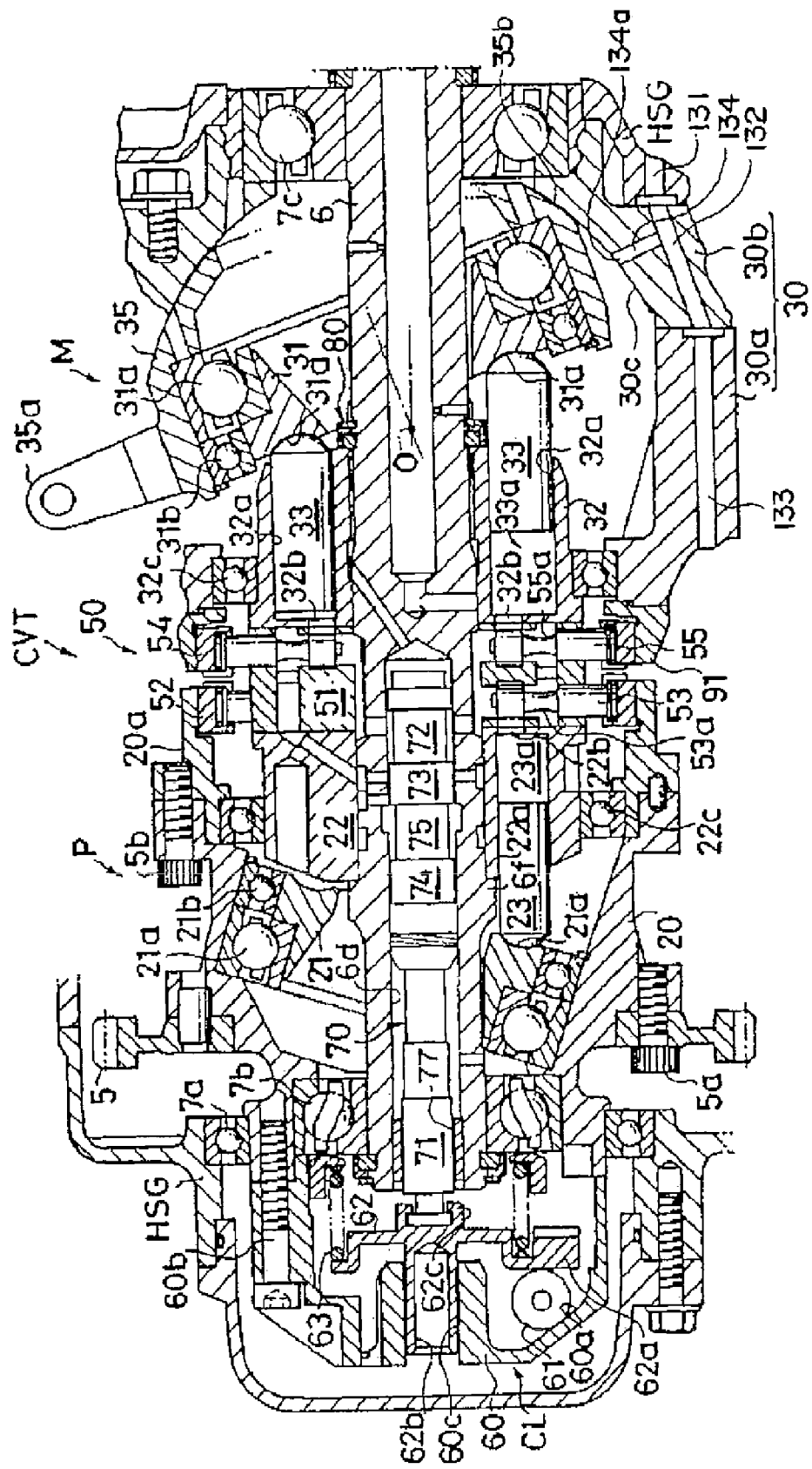
FIG. 4 is a sectional view showing the configuration of the hydrostatic continuously variable transmission.

Therefore, to stabilize clutch performance by preventing the valve spool 70 from too sensitively reacting and being moved, a shock absorbing mechanism is provided and referring to FIGS. 1, 4 and 11, the shock absorbing mechanism will be described below. As shown in these drawings, a variable oil chamber forming groove 76 is provided on the left side of the left land 74 of the valve spool 70 and a guide land 71 having a smaller diameter than that of the left land 74 is provided to the left side of the variable oil chamber forming groove 76. The guide land 71 is fitted in a guide member 77 arranged in a left end of the spool hole 6d and a variable oil chamber 78a encircled by the spool hole 6d, the guide member 77 and the left land 74 is formed on the periphery of the variable oil chamber forming groove 76.

Further, an oil reservoir forming hole 70e axially extended in the valve spool 70 is formed, a right end of the oil reservoir forming hole 70e is open, a modulator valve 150 is arranged, a left end is closed, and an orifice 70d is formed. As a result, the oil reservoir forming hole 70e is closed by the modulator valve 150 and an oil reservoir 78b is formed. A communicating hole 70c for making the variable oil chamber forming groove 76 and the oil reservoir forming hole 70e communicate is formed in the valve spool 70, and the variable oil chamber 78a and the oil reservoir 78b connect via the communicating hole 70c.

As described above, the shock absorbing mechanism is configured by the variable oil chamber 78a and the oil reservoir 78b which respectively connect via the communicating hole 70c and its operation will be described below. When the valve spool 70 is axially moved to the left, the capacity in the variable oil chamber 78a is reduced because the guide member 77 is fixed in the spool hole 6d and hydraulic fluid in the oil chamber is compressed by the left land 74. At this time, as the capacity in the oil reservoir 78b cannot be varied, the compressive force functions as resistance, the movement of the valve spool 70 is inhibited, and is moderated. In the meantime, when the valve spool 70 is axially moved to the right, the capacity in the variable oil chamber 78a increases, however, resistance to force in a direction in which the capacity increases acts by adjusting (reducing) a diameter of the communicating hole 70c, the movement of the valve spool 70 is inhibited, and is moderated.

The left end of the oil reservoir forming hole 70e is closed, however, the orifice 70d is formed, as oil flows in the orifice 70d, the magnitude of the resistance is adjusted by the orifice 70d. The orifice 70d is open to a coupling part for fitting the fitting part 62c of the pressure receptor 62 and a left end of the valve spool 70 and the coupling part is lubricated by oil exhausted through the orifice 70d.

In the shock absorbing mechanism configured as described above, the modulator valve 150 is attached so as to fill hydraulic fluid in the variable oil chamber 78a and the oil reservoir 78b. Referring to FIGS. 12 to 14, the modulator valve will be described below. A communicating hole 70a that communicates with the modulator valve 150 is formed in the right groove 72 of the valve spool 70 and hydraulic fluid in the right groove 72 flows into the modulator valve 150 via the communicating hole 70a. The modulator valve 150 includes a so-called pressure reducing valves and the hydraulic fluid in the right groove 72 is supplied to the oil reservoir 78b so that oil pressure in the oil reservoir 78b is held at a predetermined low pressure set by the modulator valve 150. Therefore, a predetermined low-pressure hydraulic fluid set by the modulator valve 150 is ordinarily filled in the variable oil chamber 78a and the oil reservoir 78b.

As oil in the oil reservoir 78b is ordinarily exhausted through the orifice 70d, oil of the exhausted quantity is supplemented via the modulator valve 150. As the supplemented oil is oil in the right groove 72 and the right groove 72 communicates with the oil passage 56 on the low pressure side or the oil passage 57 on the high pressure side according to an engaged/disengaged condition of the clutch, hydraulic fluid in the oil passage 56 on the low pressure side and the oil passage 57 on the high pressure side, that is, hydraulic fluid in the hydraulic closed circuit is used for supplemented oil. Therefore, the hydraulic fluid in the hydraulic closed circuit is ordinarily exhausted by the quantity of supplemented oil, the exhausted hydraulic fluid is replaced with fresh hydraulic fluid (a hydraulic fluid replacement system will be described later), and the temperature of the hydraulic fluid in the closed circuit can be prevented from rising.

Further, an exhaust hole 70b that pierces the valve spool from the oil reservoir 78b (the oil reservoir forming hole 70e) to the outside face of the left land 74 is formed in the valve spool 70 and an exhaust hole 6e that connects from the spool hole 6d to the outside is formed in the transmission output shaft 6. As shown in FIG. 13, when the valve spool 70 is located in the partial clutch engagement, both exhaust holes 70b, 6e communicate via a peripheral groove 70f of the valve spool 70. As a result, in the condition of partial clutch engagement, hydraulic fluid in the oil reservoir 78b is exhausted outside via both exhaust holes 70b, 6e.

As described above, in the condition of partial clutch engagement, the inside passage 56 and the outside passage 57 partially communicate, as hydraulic fluid flows from the oil passage on the high pressure side to the oil passage on the low pressure side in the hydraulic closed circuit through the partial communicating part, the temperature of the hydraulic fluid in the hydraulic closed circuit easily rises. When hydraulic fluid in the oil reservoir 78b is exhausted outside via both exhaust holes 70b, 6e in the condition of partial clutch engagement as described above, hydraulic fluid of an exhausted quantity is supplemented via the modulator valve 150. As the supplemented oil is oil in the right groove 72 and the right groove 72 communicates with the oil passage 56 on the low pressure side or the oil passage 57 on the high pressure side according to the engaged/disengaged condition of the clutch, hydraulic fluid in the oil passage 56 on the low pressure side and the oil passage 57 on the high pressure side, that is, hydraulic fluid in the hydraulic closed circuit is used for supplemented oil. Therefore, the hydraulic fluid in the hydraulic closed circuit is ordinarily exhausted by the quantity of supplemented oil, the exhausted oil is replaced with fresh hydraulic fluid (the hydraulic fluid replacement system will be described later), and the temperature of the hydraulic fluid in the closed circuit can be effectively prevented from rising particularly in the condition of partial clutch engagement.

Figure 19A:
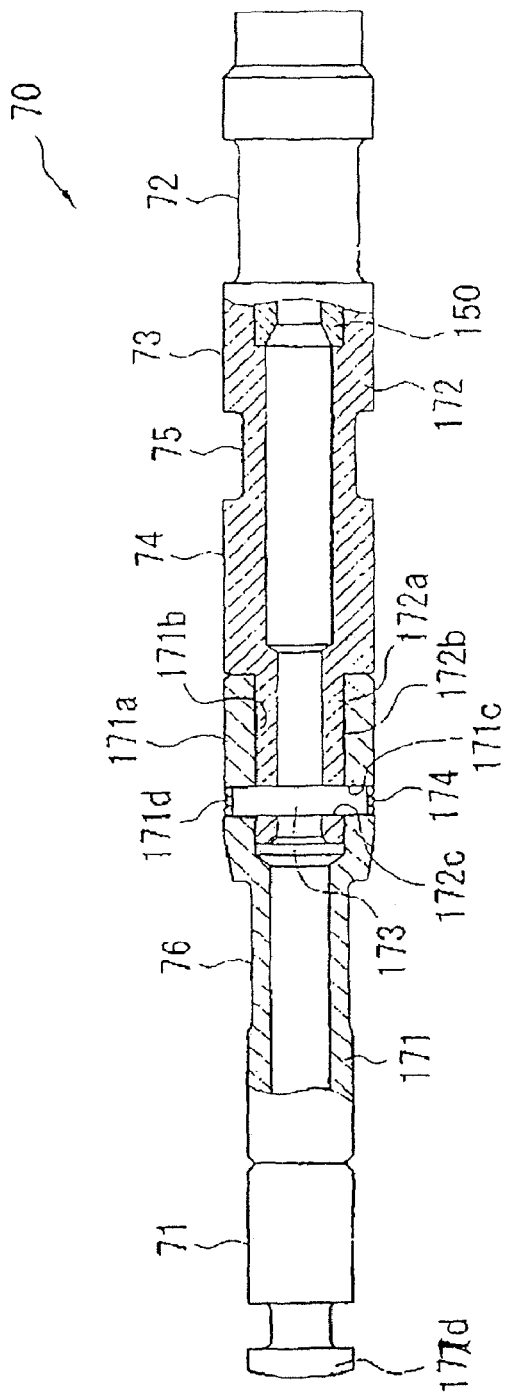
FIG. 19(a) is a partial sectional view showing the configuration of a valve spool forming the clutch of the hydrostatic continuously variable transmission.
Figure 19B:
FIGS. 19(b), 19(c) and 19(d) are views showing the retaining ring.
Figure 19C:
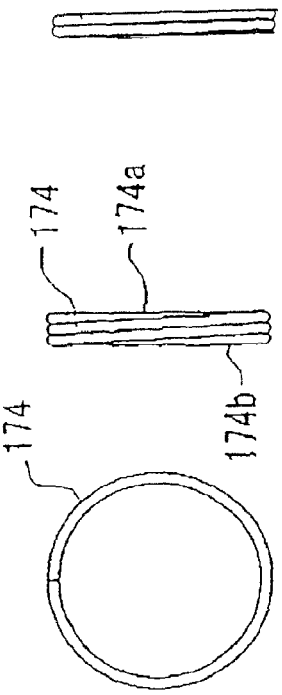
Figure 19D:

As the valve spool 70 forming the clutch CL described above is an axially extended long cylindrical member and high dimensional precision is required for outside dimensions of the guide land 71 fitted in the guide member 77, the central land 73 and the left land 74, the valve spool is divided into a first spool member 171 and a second spool member 172. Referring to FIGS. 19(a) to 19(d), the configuration of the valve spool 70 and the ring 174 will be described below. As illustrated in FIG. 19(d) the ring 174 may be slightly narrower in width as compared to the width of the holding groove 171d.

The first spool member 171 is the cylindrical member provided with a fitted part 177d fitted to the fitting part 62c of the pressure receptor 62 at its left end provided with the guide land 71 fitted in the guide member 77 next to the fitted part. The guide land 71 is fitted in the guide member 77, functions as a part for guiding the axial movement of the valve spool 70, the fitted part functions as a part for sealing the variable oil chamber 78a, and its outside dimension is required to be finished to have a high precision.

In the first spool member 171, the variable oil chamber forming groove 76 is formed on the right side of the guide land 71 and at its right end, a fitting concave portion 171a in which a concentric fitting hole 171b is formed that axially extends inward and is open to the right end side. A first coupling hole 171c extending in a direction perpendicular to the axis is formed in the fitting concave portion 171a and an annular holding groove 171d concave in a circumferential direction is formed on the periphery of the first coupling hole 171c.

In the meantime, in the second spool member 172, a valve part which is provided with the right groove 72, the central land 73, the left groove 75 and the left land 74, which executes communication/cutoff control between the inside branched oil passage 6a and the outside branched oil passages 6b, 6c and which executes clutch control is formed. In this valve part, the central land 73 and the left land 74 function as a valve as described above and their outside dimensions are required to be finished to have a high precision.

At a left end of the second spool member 172, a fitting convex portion 172a having a concentric fitting protruded cylindrical face 172b protruded on the axial left side is provided. The fitting protruded cylindrical face 172b is formed in dimensions fitted into the fitting hole 171b and a second coupling hole 172c is pierced, the second coupling hole 172c is matched with the first coupling hole 171c in a condition fitted into the fitting hole 171b and extends in a direction perpendicular to the axis.

In the first spool member 171 and the second spool member 172 respectively configured as described above, a coupling pin 173 is inserted into the first and second coupling holes 171c, 172c matched in a condition in which the fitting convex portion 172a is fitted into the fitting concave portion 171a, the first and second spool members are lockably coupled with the coupling pin 173 in the center to form the valve spool 70. As a high dimensional precision is required for only the outside diameter of the guide land 71 in the first spool member 171 and for only the respective outside diameters of the central land 73 and the left land 74 in the second spool member 172 respectively by dividing the valve spool 70 into the first and second spool members 171, 172 as described above, the manufacture of these spool members is facilitated and the dimensional precision of the outside diameters can be easily enhanced.

As the coupling pin 173 is relatively moderately inserted into the first and second coupling holes 171c, 172c, a ring 174 is fitted into the holding groove 171d to prevent the coupling pin 173 from falling out. As a result, the ring 174 is fitted with the ring covering an opening at a peripheral end of the first coupling hole 171c for closing both ends of the coupling pin 173, and for preventing the coupling pin from falling out.

The ring 174 is formed in a coil by bending the wire, which is circular or rectangular in section, in a ring a plurality of times. Therefore, the ring 174 can be easily fitted into the holding groove 171d by spreading the diameter of the coil. End faces 174a, 174b on both sides of the ring 174 are worked to be flat and as shown in FIG. 19(C), the lateral width of the ring is equal overall. The lateral width is set to be slightly narrower than the width of the holding groove 171d and the ring 174 is fitted into the holding groove 171d without rattling.

In this embodiment, the ring 174 is formed by bending the wire in the ring a plurality of times to be the coil. However, the ring may be also formed by bending a thick wire into a ring only once. However, in this case, it is desirable that the ends are overlapped without clearance in a circumferential direction. An inside face of the ring 174 may be also attached to the holding groove 171d with a loose fit (with clearance). Hereby, the valve spool 70 can be easily inserted into the spool hole 6d.

Figure 15:
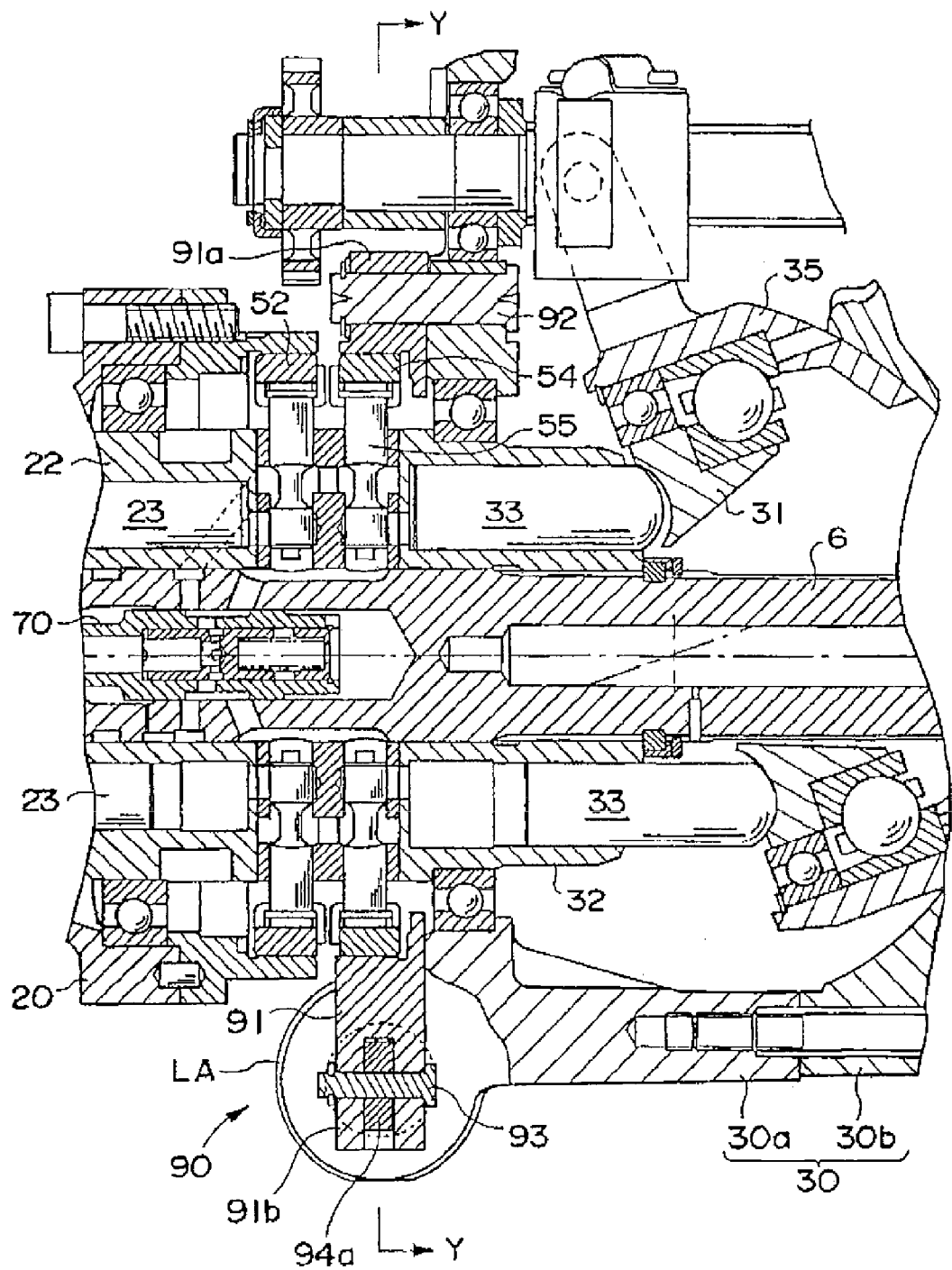
FIG. 15 is a sectional view showing the structure of a lock-up mechanism in the hydrostatic continuously variable transmission.
Figure 16:
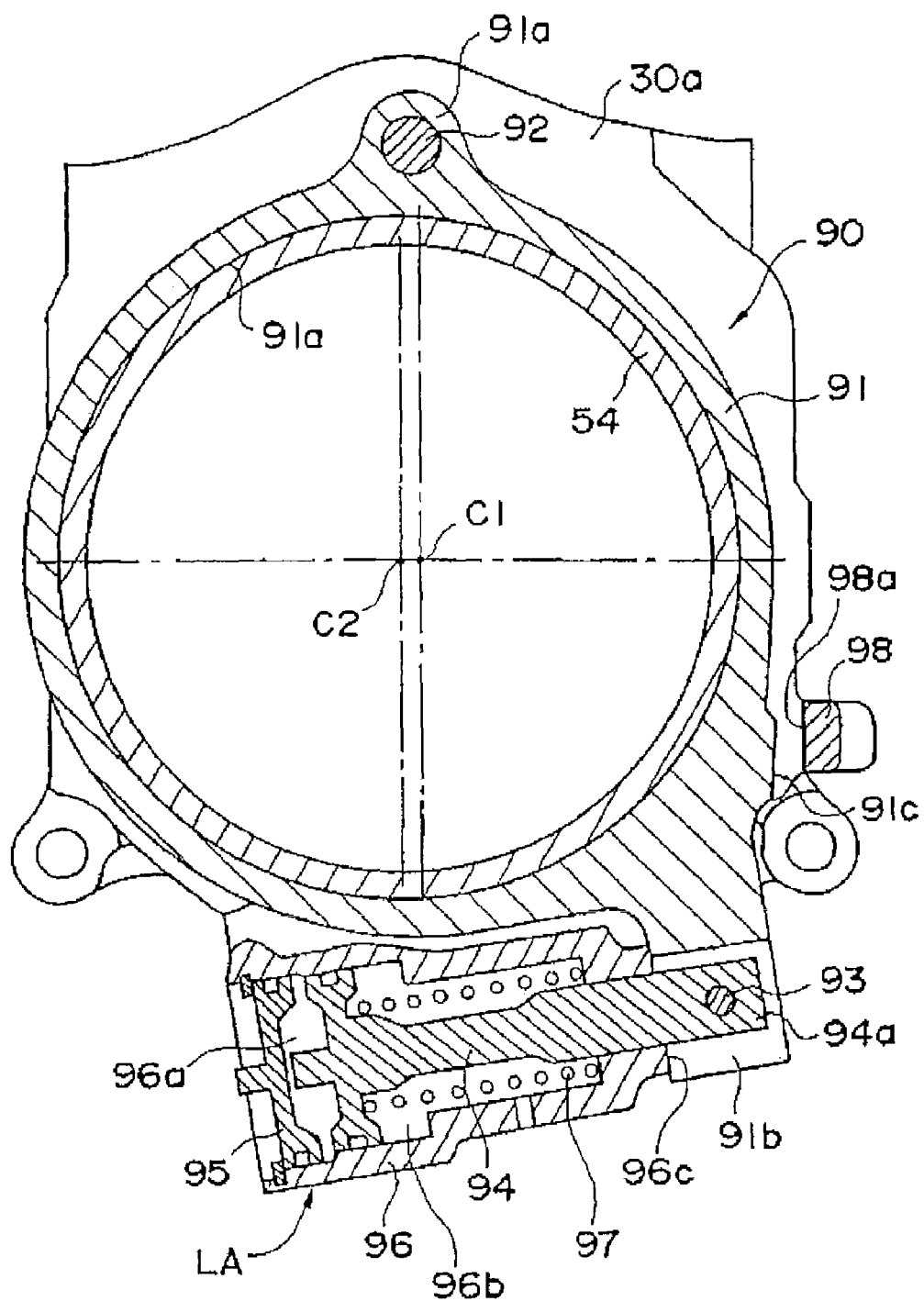
FIG. 16 is a sectional view showing the structure when the lock-up mechanism is located in a normal position in a condition viewed along a line Y-Y shown in FIG. 15.
Figure 17:
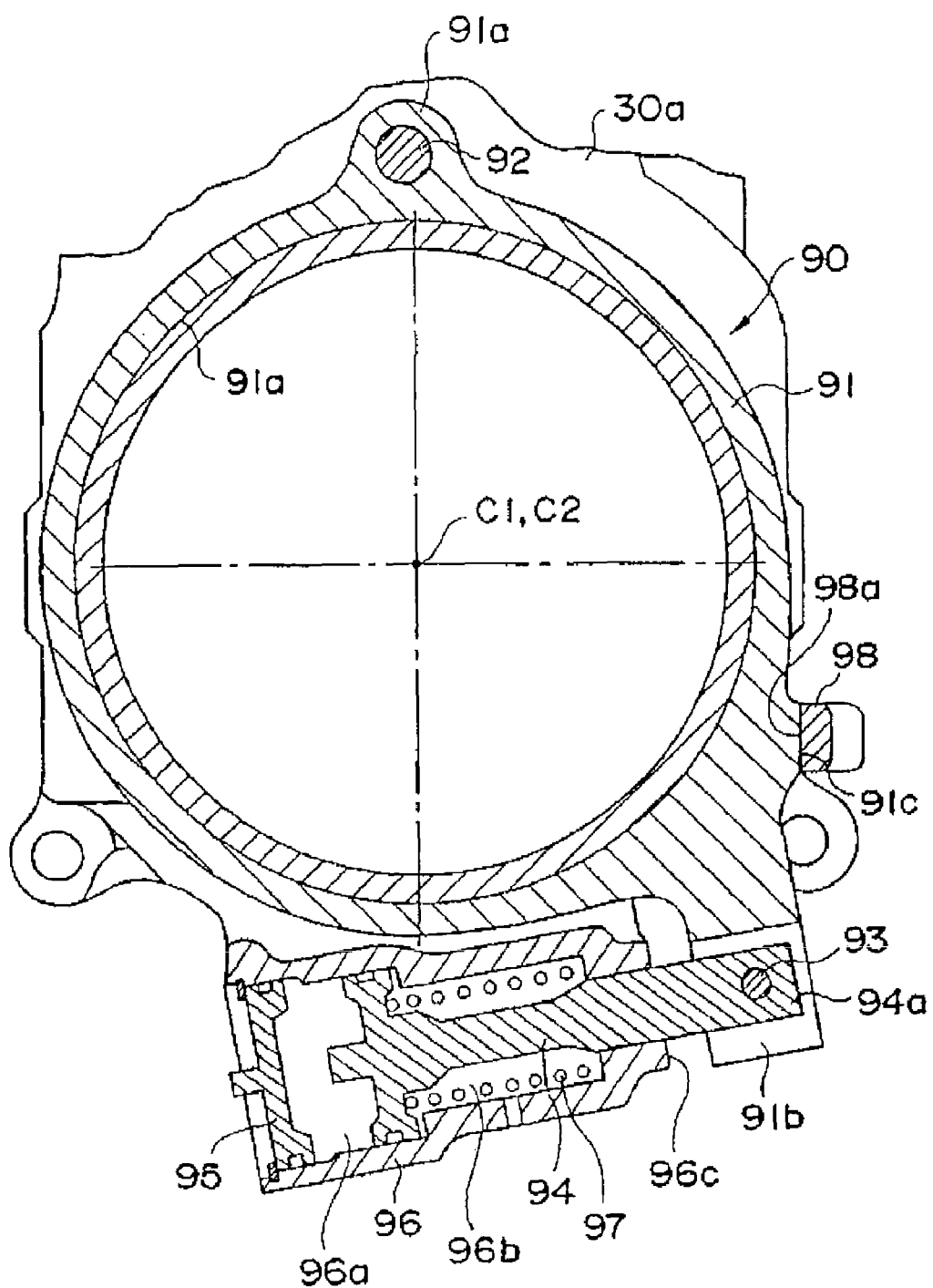
FIG. 17 is a sectional view showing the structure when the lock-up mechanism is located in a lock-up position in a condition viewed along the line Y-Y shown in FIG. 15.

In the hydrostatic continuously variable transmission CVT configured as described above, a lock-up mechanism 90 is provided, the lock-up mechanism 90 closes the hydraulic closed circuit to be a lock-up condition when a transmission gear ratio is 1.0, that is, when the input revolution speed of the hydraulic pump P and the output revolution speed of the hydraulic motor M are equal. Referring to FIGS. 15 to 17, the lock-up mechanism 90 will be described below. The lock-up mechanism 90 is provided with the motor eccentric member 91 slid on the end of the motor casing 30b as described above. The whole motor eccentric member 91 is formed in a ring and the motor-side cam ring 54 is arranged on its inside face 1a. A fitting part 91a is formed at an upper end of the motor eccentric member 91, is fastened to the motor casing 30b by a fitting pin 92, and the motor eccentric member 91 is rockably attached to the motor casing 30b with the fitting pin 92 in the center.

To rock the motor eccentric member 91, a lock-up actuator LA is attached to the motor casing 30b with the lock-up actuator located on the downside of the motor eccentric member 91. The lock-up actuator LA is configured by a cylinder 96 is fixed to the motor casing 30b, a piston 94 is slidably arranged in a cylinder hole of the cylinder 96, a lid 95 that closes the cylinder hole and is attached to the cylinder 96 and a spring 97 that energizes the piston 94 toward the lid 95. The cylinder hole is divided in two by the piston 94, a lock-up hydraulic fluid chamber 96a and a lock-up release chamber 96b are formed, and a spring 97 is arranged in the lock-up release chamber 96b. An end of the piston 94 is protruded outward from the cylinder 96 and the protruded part 94a is fastened to a coupling part 91b formed in a lower part of the motor eccentric member 91 via a coupling pin 93.

In the lock-up mechanism 90 configured as described above, when the oil pressure of the lock-up hydraulic fluid chamber 96a is released, the piston 94 is moved on the side of the lid 95 by the energizing force of the spring 97 arranged in the lock-up release chamber 96b. At this time, as shown in FIG. 16, the coupling part 91b is touched to an outer end face 96c of the cylinder 96, in this condition, the center C2 of the inside face 91a of the motor eccentric member 91 is eccentric with the center C1 of the transmission output shaft 6 and the output rotor (the motor cylinder 32), and the motor eccentric member 91 is located in a normal position.

When the lock-up hydraulic fluid pressure is supplied to the lock-up hydraulic fluid chamber 96a, the piston 94 is moved to the right against the energizing force by the spring 97 by the fluid pressure as shown in FIG. 17 and the protruded part 94a is further protruded. Thus, the motor eccentric member 91 is rocked counterclockwise with the fitting pin 95 in the center as shown in FIG. 17 and as shown in FIG. 17, a contact face 91c formed on the side of the motor eccentric member 91 is touched to a contact face 98a of a positioning projection 98 integrated with the motor casing 30a. In this condition, the center C2 of the inside face 91a of the motor eccentric member 91 is overlapped with the center C1 of the transmission output shaft 6 and the output rotor (the motor cylinder 32) and the motor eccentric member 91 is located in a lock-up position.

As is known from the configuration of the hydraulic motor M and the configuration of the distributing valve 50 respectively described above, when the motor eccentric member 91 is located in the lock-up position, the center of the motor-side cam ring 54 arranged on the inside face 91a coincides with the rotational center of the motor cylinder 32, even if the motor cylinder 32 is rotated, the motor-side spool 55 is not reciprocated, and the supply of high-pressure oil to the motor plunger 33 is cut off. At this time, the motor plunger communicates with the oil passage 56 on the low pressure side. As a result, a reduction in the compression loss and hydraulic fluid leakage in the motor plunger 33 and a reduction in the mechanical power loss of the bearing and others occurs because no high pressure is applied to the motor plunger 33. Further, the reduction in resistance in sliding the pump-side spool 53 is enabled, and power transmission is efficiency enhanced.

Figure 20:
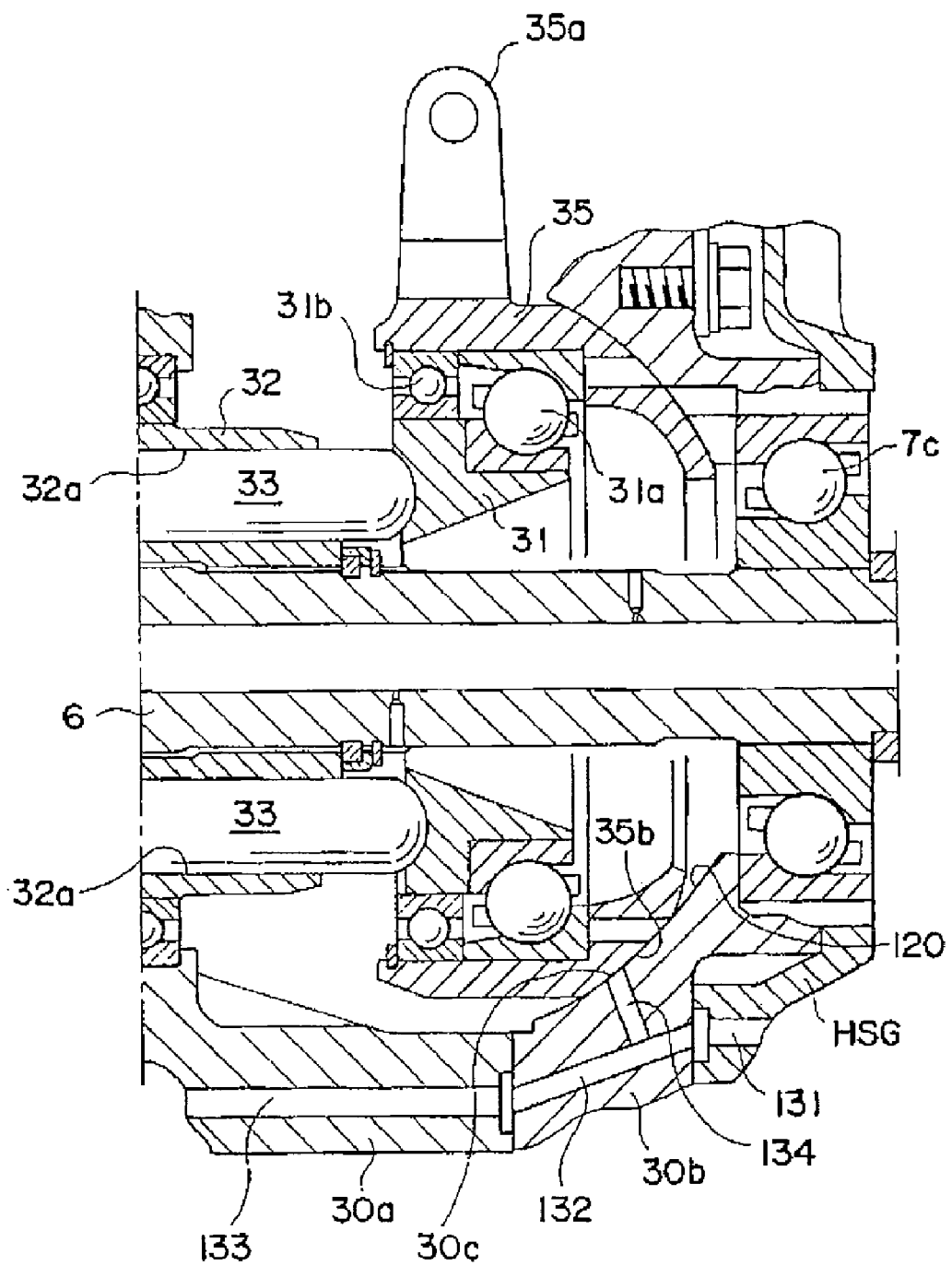
FIG. 20 is a sectional view showing the configuration of the circumference of a motor swash plate in a condition close to the gear ratio of 1.0 in the hydrostatic continuously variable transmission.

As known from the above-mentioned description, when lock-up hydraulic fluid pressure is supplied to the lock-up hydraulic fluid chamber 96a in the lock-up mechanism 90, the motor eccentric member 91 is rocked and is located in the lock-up position to be in the lock-up condition. That is, independent of the gear ratio of the hydrostatic continuously variable transmission CVT, if only lock-up hydraulic fluid pressure is supplied to the lock-up hydraulic fluid chamber 96a, the lock-up condition can be hydraulically produced. However, as described above, as lockup should be made when the transmission gear ratio is 1.0, lockup is set so that lock-up hydraulic fluid pressure cannot be supplied unless the transmission gear ratio is in the vicinity of 1.0. Referring to FIGS. 1, 4 and 20, this configuration will be described below.

Lockup control oil passages 131, 132, 133 for supplying lock-up hydraulic fluid pressure to the lock-up hydraulic fluid chamber 96a are formed in the transmission housing HSG and the motor casing 30 (30a, 30b) as shown in the drawings. The lockup control oil passage 131 connecting with a lockup control oil pressure supply control valve not shown, is controlled by the valve, and lockup control oil pressure is supplied to the lockup control oil passage. The lockup control oil passage 133 connects with the lock-up hydraulic fluid chamber 96a of the lock-up mechanism 90. Therefore, basically, an oil pressure supply control by the lockup control oil pressure supply control valve is executed and a lock-up operation control can be executed.

However, a branched oil passage 134 branched from the lockup control oil passage 132 is formed with the branched oil passage open to a concave supporting cylindrical face 30c formed on the inside face of the motor casing 30 and lock-up hydraulic fluid is exhausted in the casing from the branched oil passage 134 through an opening 134a. A convex rocking supported cylindrical face 35b that forms the back side of the motor rocking member 35 that rotatably supports the motor swash plate 31 is slid on the supporting cylindrical face 30c. In a condition wherein an angle of the swash plate is relatively large as shown in FIGS. 1 and 4, the opening 134a is open. In the meantime, as shown in FIG. 20, when the angle of the swash plate is in the vicinity of zero (a swash plate surface is in a direction perpendicular to the axis), the rocking supported face 35b covers and closes the opening 134a of the branched oil passage 134.

As described above, when the angle of the swash plate is in the vicinity of zero which is substantially zero, that is, when transmission gear ration is in the vicinity of 1.0 which is substantially 1.0, the opening 134a of the branched oil passage 134 is closed. Therefore, only in the vicinity of a position of the swash plate angle in which the transmission gear ratio is 1.0 and lockup is required, the lockup control oil pressure can be supplied to the lock-up hydraulic fluid chamber 96a via the lockup control oil passages 131 to 133. As the opening 134a of the branched oil passage 134 is open when an angle of the swash plate is except it, that is, when no lockup is required, lockup control oil pressure is exhausted in the casing through the branched oil passage 134 even if the lockup control oil pressure is supplied to the lockup control oil passage 131 and no lockup control oil pressure acts on the lockup hydraulic fluid chamber 96a.

Figure 18:
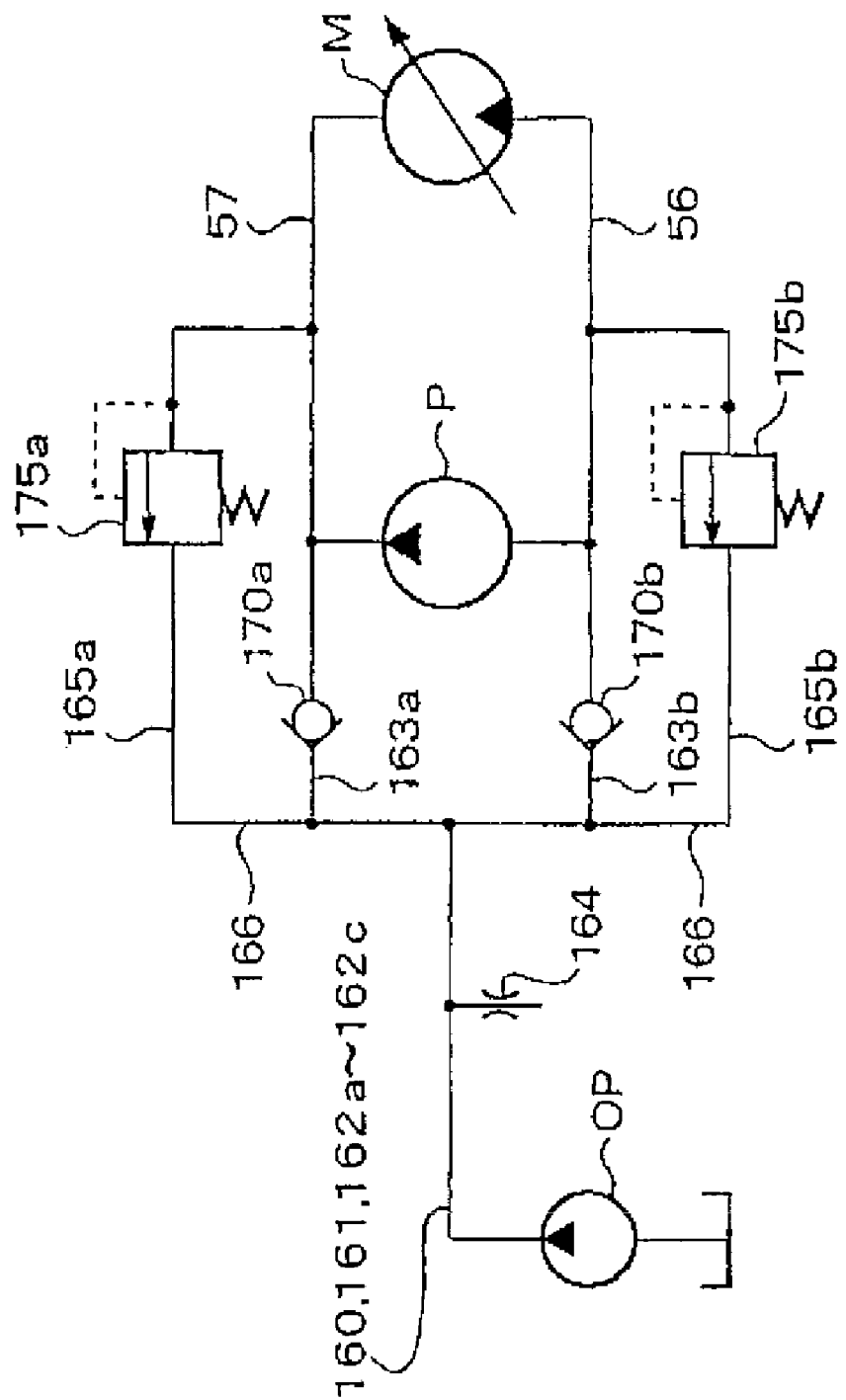
FIG. 18 is a hydraulic circuit diagram showing the oil passage configuration of the hydrostatic continuously variable transmission.

Next, referring to FIGS. 12 to 14 and FIG. 18, the configuration of a system for supplementing hydraulic fluid in the hydraulic closed circuit will be described. As shown in FIG. 18, hydraulic fluid is supplemented by the oil pump OP (see FIG. 3) and discharged oil from the oil pump OP driven by the engine E is supplied to an oil passage 160 axially extending in the transmission output shaft 6 via an oil passage in the transmission housing HSG. The oil passage 160 connects with an oil passage 161 extending in a radial direction in the transmission output shaft 6 and opens to the periphery at the end of the oil passage 160. The oil passage 161 further connects with oil passages 162a, 162b, 162c axially extending in the output rotor (the motor cylinder 32, the valve body 51 and the pump cylinder 22), an orifice 164 communicating with the outside is formed at the end of the oil passage 162c, and the inside of the transmission is lubricated by hydraulic fluid that flows outside from the orifice 164.

A first check valve 170a for supplying supplemented oil to the outside passage 57 and a first relief valve 175a for relieving hydraulic fluid when oil pressure in the outside passage 57 exceeds a predetermined high pressure are provided in the pump cylinder 22 as shown in FIGS. 12 to 14. Further, a second check valve 170b for supplying supplemental oil to the inside passage 56 and a second relief valve 175b for relieving the hydraulic fluid when the oil pressure in the outside passage 57 exceeds a predetermined high pressure respectively having the similar configuration to the configuration of the above-mentioned valves are also provided though the two valves are not shown in FIGS. 12 to 14.

An oil passage 163a that connects the oil passage 162c and the first check valve 170a is formed in the pump cylinder 22 as shown in FIGS. 12 to 14 and hydraulic fluid supplied from the oil pump OP is supplied to the outside oil passage 57 via the first check valve 170a as supplemented oil if necessary (according to leakage from the hydraulic closed circuit). The plurality of oil passages 162a, 162b, 162c are formed, an oil passage 163b that connects an oil passage 162c and a second check valve 170b is formed in the pump cylinder 22, and hydraulic fluid supplied from the oil pump OP is supplied to the inside oil passage 56 via the second check valve 170b as supplemental oil if necessary (according to leakage from the hydraulic closed circuit).

Hydraulic fluid relieved from the first relief valve 175a when oil pressure in the outside passage 57 exceeds a predetermined high pressure set by energizing means is exhausted in a return oil passage 165a formed in the pump cylinder 22. The return oil passage 165a communicates with a ting oil passage 166 formed on the periphery of the transmission output shaft 6 in a ring, fitted to the pump cylinder 22 and is encircled by the pump cylinder. The oil passage 166 communicates with the oil passage 162c via the oil passage 163a and as known, hydraulic fluid relieved from the first relief valve 175a is exhausted in an oil passage for supplying supplemented oil supplied from the oil pump OP. Hydraulic fluid relieved from the second relief valve 175b is also exhausted in the oil passage 162c, that is, in a supplemented oil supply oil passage from the return oil passage 165h via the ring oil passage 166 and the oil passage 163b though the passages are not shown.

As described above, as hydraulic fluid relieved from the first and second relief valves 175a, 175b is exhausted in the supplemented oil supply oil passage 162c through the return oil passages 165a, 165b and relieved oil is never returned to the hydraulic closed circuit. Thus, the rise in oil temperature in the hydraulic closed circuit can be inhibited. As oil pressure in the supplemented oil supply oil passage 162c is stable, hydraulic fluid in the oil passage on the high pressure side can be efficiently relieved.

As the supplemental oil supply oil passage extends from the transmission output shaft 6 into the output rotor, the first and second relief valves 175a, 175b and the return oil passages 165a, 165b are arranged in the pump cylinder 22 (the output rotor) and the return oil passages 165a, 165b connect with the supplemented oil supply oil passage 162c in the pump cylinder 22, high-pressure relief structure is compactly housed in the pump cylinder 22 and can be made compact. Thus, the return oil passages 165a, 165b can be reduced. The return oil passages 165a, 165b connect with the supplemented oil supply oil passages 162c (and 163a, 163b) via the ring oil passage 166 circumferentially extending in the part fitted to the pump cylinder 22 on the outside face of the transmission output shaft 6 and the oil passages coupling structure in the part is simple.

The embodiment described above is a continuously variable transmission adopted for use in a motorcycle. However, the invention is not limited to being adopted for use in a motorcycle and can be adopted in various power transmission mechanism such as a four-wheel vehicle, a vehicle including an automobile and a general purpose machine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shaft member coupling structure in which two shaft members are lockably coupled in a condition wherein the two shaft members coaxially extend with a coupling part in the center, comprising:
   a first shaft member having a proximal end and a distal end;
   a second shaft member having a proximal end and a distal end
   a fitting concave portion axially extending and formed at the proximal end of said first shaft member and a fitting convex portion axially extending and fitted into the fitting concave portion, said fitting convex portion being formed at the proximal end of the second shaft member;
   a coupling pin inserted into coupling holes that pierce the first and second shaft members in a direction perpendicular to the axis in a part in which the fitting concave portion and the fitting convex portion are fitted and the first and second shaft members are lockably coupled with the coupling pin in the center;
   an annular holding groove concave in a circumferential direction is formed in a part in which the coupling hole is formed on a periphery of the first shaft member provided with the fitting concave portion; and
   both ends of the coupling pin inserted into the coupling holes are covered with a ring fitted into the annular holding groove;
   said distal end of the first shaft member extends from the proximal end of the first shaft member and includes an oil chamber groove and a guide land formed thereon;
   said distal end of the second shaft member extends from the proximal end of the second shaft member and includes at least one groove and a guide land formed thereon,
   wherein the second shaft member includes a right groove, a central land, a left groove and a left land for providing communication and terminating communication between an inside branched oil passage and outside branched oil passages for executing clutch control.

2. The shaft member coupling structure according to claim 1, wherein the ring is a wire in a shape of a ring in a shape of a circle, the wire having ends which are lapped and bound.

3. The shaft member coupling structure according to claim 2, wherein the ring is formed in the shape of a coil the wire of the coil being wound in the annular holding groove a plurality of times.

4. The shaft member coupling structure according to claim 3, wherein the side of a part in which the end of the wire is lapped of the ring is worked; and
   the ring is provided with a slightly narrower width than the width of the holding groove overall.

5. The shaft member coupling structure according to claim 2, wherein the side of a part in which the end of the wire is lapped of the ring is worked; and
   the ring is provided with a slightly narrower width than the width of the holding groove overall.

6. The shaft member coupling structure according to claim 1, wherein the two shaft members form a valve spool with the first shaft member being a first spool member and the second shaft member being a second spool member.

7. The shaft member coupling structure according to claim 6, wherein the oil chamber groove formed on the first spool member is a variable oil chamber forming groove formed on a right side of the guide land at a right end of the distal end of the first shaft member.

8. A shaft member coupling structure in which two shaft members are lockably coupled in a condition wherein the two shaft art in the center, comprising
   a first shaft member having a proximal end and a distal end;
   a second shaft member having a proximal end and a distal end
   a fitting concave portion axially extending and formed at the proximal end of said first shaft member and a fitting convex portion axially extending and fitted into the fitting concave portion, said fitting convex portion being formed at the proximal end of the second shaft member;
   a coupling pin inserted into coupling holes that pierce the first and second shaft members in a direction perpendicular to the axis in a part in which the fitting concave portion and the fitting convex portion are fitted and the first and second shaft members are lockably coupled with the coupling pin in the center;
   an annular holding groove concave in a circumferential direction is formed in a part in which the coupling hole is formed on a periphery of the first shaft member provided with the fitting concave portion; and
   both ends of the coupling pin inserted into the coupling holes are covered with a ring fitted into the holding groove;
   said distal end of the first shaft member extends from the proximal end of the first shaft member and includes an oil chamber groove and a guide land formed thereon;
   said distal end of the second shaft member extends from the proximal end of the second shaft member and includes at least one groove and a guide land formed thereon,
   wherein the ring is a coil made of a wire with a plurality of bends, a diameter of the coil being spreadable in order to enable the coil to be fit into the annular holding groove by spreading the diameter of the coil.

9. The shaft member coupling structure according to claim 8, wherein a lateral width of the coil is slightly narrower relative to a width of the annular holding groove.

10. A shaft member coupling structure comprising:
    a first shaft member having a proximal end and a distal end;
    a second shaft member having a proximal end and a distal end, said first and second shaft members being lockably coupled in a condition wherein the first and second shaft members coaxially extend with a coupling part therebetween;

a first fitting concave portion axially extending and formed at the proximal end of first shaft member;

a corresponding second fitting portion axially extending and fitted into the first fitting concave portion, said second fitting portion being formed at the proximal end of the second shaft member;

a coupling pin inserted into coupling holes that pierce the first and second shaft members in a direction perpendicular to an axis of the first and second shaft members in a part in which the first fitting portion and the second fitting portion are fitted and the first and second shaft members are lockably coupled with the coupling pin;

an annular holding groove formed in a circumferential direction in a part in which the coupling hole is formed on a periphery of the first shaft member provided with the first fitting concave portion; and both ends of the coupling pin inserted into the coupling holes are covered with a ring fitted into the annular holding groove;

said distal end of the first shaft member extends from the proximal end of the first shaft member and includes an oil chamber groove and a guide land formed thereon;

said distal end of the second shaft member extends from the proximal end of the second shaft member and includes at least one groove and a guide land formed thereon, wherein the ring is formed in a shape of a coil made of a wire which is wound in the annular holding groove in the circumferential direction a plurality of times.

11. The shaft member coupling structure according to claim 10, wherein the wire of the ring has a shape of a circle, the wire having ends which are lapped and bound.

12. The shaft member coupling structure according to claim 11, wherein the side of a part in which the end of the wire is lapped of the ring is worked; and the ring is provided with a slightly narrower width than the width of the holding groove overall.

13. The shaft member coupling structure according to claim 10, wherein the first and second shaft members form a valve spool with the first shaft member being a first spool member and the second shaft member being a second spool member.

14. The shaft member coupling structure according to claim 13, wherein the oil chamber groove formed on the first spool member is a variable oil chamber forming groove formed on a right side of the guide land at a right end of the distal end of the first shaft member.

15. The shaft member coupling structure according to claim 13, wherein the second spool member includes a right groove, a central land, a left groove and a left land for providing communication and terminating communication between an inside branched oil passage and outside branched oil passages for executing clutch control.

16. The shaft member coupling structure according to claim 10, wherein a lateral width of the coil is slightly narrower relative to a width of the annular holding groove.

* * * * *